United States Patent
Blasco Serrano et al.

(10) Patent No.: US 10,313,851 B2
(45) Date of Patent: Jun. 4, 2019

(54) LIMITED SENSING FOR VEHICLE-TO-X COMMUNICATIONS

(71) Applicant: Telefonaktiebolaget LM Ericsson (publ), Stockholm (SE)

(72) Inventors: Ricardo Blasco Serrano, Stockholm (SE); Marco Belleschi, Solna (SE); Hieu Do, Järfälla (SE); Stefano Sorrentino, Solna (SE); Wanlu Sun, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 33 days.

(21) Appl. No.: 15/550,196

(22) PCT Filed: Jul. 3, 2017

(86) PCT No.: PCT/SE2017/050741
§ 371 (c)(1),
(2) Date: Aug. 10, 2017

(87) PCT Pub. No.: WO2018/030937
PCT Pub. Date: Feb. 15, 2018

(65) Prior Publication Data
US 2018/0279094 A1    Sep. 27, 2018

Related U.S. Application Data

(60) Provisional application No. 62/374,232, filed on Aug. 12, 2016.

(51) Int. Cl.
*H04L 12/801*    (2013.01)
*H04B 1/50*    (2006.01)
(Continued)

(52) U.S. Cl.
CPC ............. *H04W 4/40* (2018.02); *H04W 8/005* (2013.01); *H04W 72/02* (2013.01); *H04W 72/04* (2013.01);
(Continued)

(58) Field of Classification Search
CPC ....... H04W 4/40; H04W 8/005; H04W 72/02; H04W 72/0446
See application file for complete search history.

(56) References Cited

U.S. PATENT DOCUMENTS

2016/0360524 A1* 12/2016 Blasco Serrano .... H04W 76/14
2017/0265198 A1*  9/2017 Sorrentino ............ H04W 72/12
(Continued)

FOREIGN PATENT DOCUMENTS

EP      3 110 052 A1    12/2016
WO     WO 2015/126115 A1    8/2015

OTHER PUBLICATIONS

3GPP TSG RAN WG1 Meeting #78bis, "On Remaining Details of Resource Pool Configuration for D2D Communication," R1-143763, Intel Corporation, pp. 1-7 (Oct. 2014).
(Continued)

*Primary Examiner* — Faruk Hamza
*Assistant Examiner* — Abusayeed M Haque
(74) *Attorney, Agent, or Firm* — Sage Patent Group

(57) ABSTRACT

A method by a first UE for selecting a radio resource for transmitting a packet, includes obtaining a basic period value related to expected timing of transmissions by a second UE. A sub-period value is obtained that is less than the basic period value. Radio resources are monitored for a packet or booking message that is transmitted by the second UE and indicates that the second UE will potentially transmit a next packet using a radio resource and timing. The monitoring is restricted to a timeframe determined based on
(Continued)

the sub-period value within each occurrence of a time period determined based on the basic period value. Responsive to the monitoring identifying the packet or booking message, a radio resource is selected for use in transmitting a packet based on the radio resource and timing that is potentially to be used by the second UE to transmit the next packet.

27 Claims, 12 Drawing Sheets

(51) Int. Cl.
*H04L 29/06* (2006.01)
*H04W 4/40* (2018.01)
*H04W 72/04* (2009.01)
*H04W 8/00* (2009.01)
*H04W 72/02* (2009.01)
*H04W 48/16* (2009.01)
*H04W 76/14* (2018.01)

(52) U.S. Cl.
CPC ........ *H04W 72/0446* (2013.01); *H04W 48/16* (2013.01); *H04W 76/14* (2018.02)

(56) References Cited

U.S. PATENT DOCUMENTS

2018/0242190 A1* 8/2018 Khoryaev ......... H04W 28/0284
2018/0376474 A1* 12/2018 Khoryaev ......... H04W 72/0446

OTHER PUBLICATIONS

Notification of Transmittal of the International Search Report and the Written Opinion of the International Searching Authority, or the Declaration for PCT International Application No. PCT/SE2017/050741 dated Oct. 5, 2017, pp. 1-16.
International Preliminary Report on Patentability, PCT/SE2017/050741, dated Nov. 22, 2018, 20 Pages.
3GPP TSG RAN WG1 Meeting #86, Discussion on P2x, Ericsson, 5 pages (Aug. 22-26, 2016).

* cited by examiner

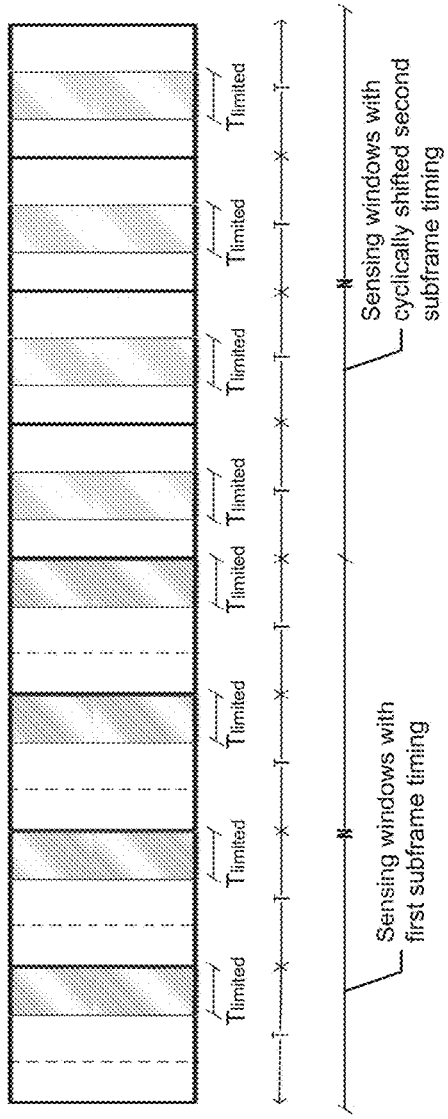
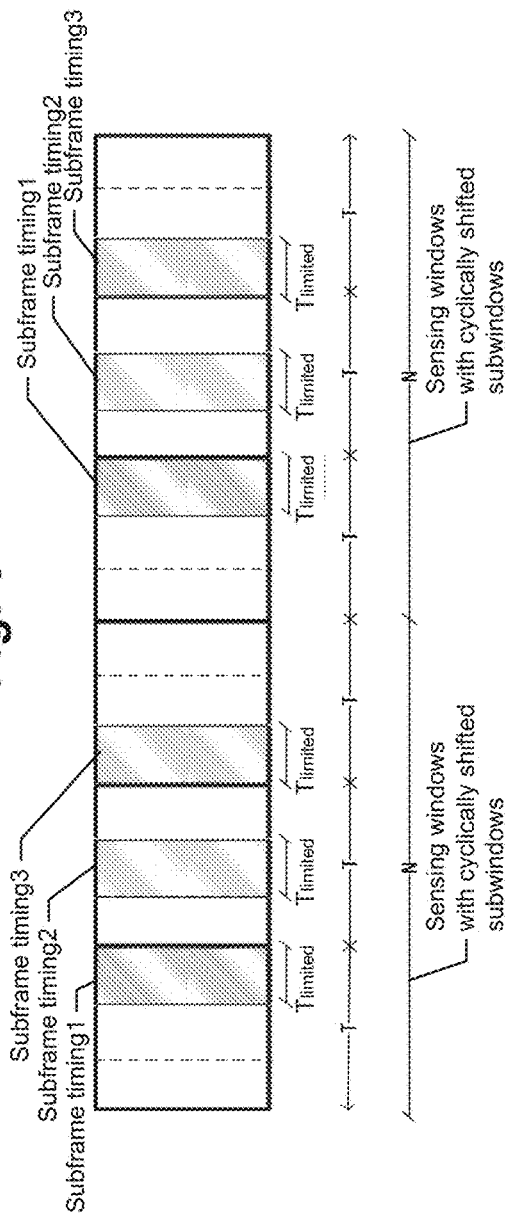
Fig. 5
Fig. 6

LIMITED SENSING FOR VEHICLE-TO-X COMMUNICATIONS

CROSS REFERENCE TO RELATED APPLICATION

This application is a 35 U.S.C. § 371 national stage application of PCT International Application No. PCT/SE2017/050741, filed on Jul. 3, 2017, which itself claims priority to U.S. Provisional Application No. 62/374,232 filed on Aug. 12, 2016, the disclosure and content of both of which are incorporated herein by reference in their entireties.

TECHNICAL FIELD

The present disclosure relates to methods and operations by user equipments for resource management and distributed resource allocation, such as in D2D or more particularly V2X communications.

BACKGROUND

During Release 12, the LTE standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

D2D communications may be extended to support Vehicle-to-X (V2X) communications, which includes any combination of direct communication between vehicles, pedestrian carried devices, and infrastructure mounted devices. V2x communication may take advantage of available network (NW) infrastructure, although at least basic V2x connectivity can be possible in case of lack of available network infrastructure. Providing an LTE-based V2x interface may be economically advantageous because of the LTE economies of scale and it may enable tighter integration between communications with the NW infrastructure (vehicle-to-infrastructure (V2I)), vehicle-to-pedestrian (V2P), and vehicle-to-vehicle (V2V) communications, as compared to using a dedicated V2x technology.

V2x communications may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. Devices check availability of a CAM message every 100 ms, yielding a maximum detection latency requirement is not more than 100 ms for most CAM messages. However, the latency requirement for Pre-crash sensing warning is not more than 50 ms.

A DENM message is event-triggered, such as by braking, and the availability of a DENM message is also checked for every 100 ms, and the requirement of maximum latency is not more than 100 ms.

The package size of CAM and DENM message can vary from more than 100 to more than 800 bytes, although the typical size is around 300 bytes depending on the specific V2X use case, message type (e.g. DENM can be larger than CAM), and depending on the security format included in the packet (e.g., full certificate or certificate digest). The message is supposed to be detected by all vehicles in proximity.

The Society of the Automotive Engineers (SAE) has defined a Basic Safety Message (BSM) for DSRC with various defined messages sizes. Based on the importance and urgency of the messages, the BSMs are further classified into different priorities.

Sensing-Based Resource Allocation with Booking

In V2x communications, two major types of traffic are distinguished: recurrent traffic and event-triggered traffic. Various embodiments disclosed herein are mostly related to recurrent traffic, where the transmitted packets arrive regularly (e.g., they may be strictly periodic or have some deviation from an average periodicity).

One efficient way to schedule recurrent-traffic V2x transmissions is to use radio resource booking. In resource allocation using resource booking a user equipment (UE) can book radio resources in advance for transmitting the next packet (including all the retransmissions). The minimum time span of a booking is usually taken to be the minimum time between two consecutive packets (e.g., the minimum message periodicity). Similarly, the maximum time span of a booking is usually taken to be the maximum time between two consecutive packets (e.g., the maximum message periodicity). For example, in V2X the time interval between the generation of two consecutive CAM messages may not be lower than 100 ms (in the absence of congestion control) and may not exceed 1 s. Thus, it is reasonable to allow bookings for 100 ms, 200 ms, . . . , or 1 s, as it is currently being considered by 3GPP. Usually, the UE signals the booking information to other UEs. This allows a receiving UE to predict the future utilization of the radio resources by reading received booking messages and schedule its current transmission to avoid using the same resources. To do so, a UE needs to sense the channel for some time duration preceding the (re)selection trigger to gather booking messages. In addition, it may also be possible to transmit unhooking messages that release previously booked resources. For accurate prediction, the sensing time should be long enough to detect booking and/or unhooking messages from other relevant UEs.

FIG. 1 illustrates an example of the sensing-based resource selection mechanism with booking. Let T be the minimum time between two recurrent transmissions by a UE, which is referred to as "basic period". That is, a UE with recurrent traffic transmits, at most, one packet every T seconds (a transmission may consist of several retransmissions, although this is not illustrated in FIG. 1 for simplicity). In FIG. 1, UE 1 transmits a packet at time to and meanwhile books, e.g., transmits a booking message to other UEs indicating, its intention to transmit the next packet at ta+4T. Similarly, UE 2 transmits a packet at time tb and meanwhile books, e.g., transmits a booking message to other UEs indicating, its intention to transmit the next packet at tb+2T. At time tc, UE3 wants to select or reselect a radio resource for its transmission within the time window [tc,tc+T]. UE3 has been monitoring the channel during a time window of size 4T. UE3 uses its channel observations in this window to predict the future utilization of the radio resources and accordingly select a radio resource for its transmission (e.g., a resource that is not indicated by the above bookings to avoid potential collision).

It is clear that to achieve good performance the sensing window must be long enough to include as many bookings as possible/necessary. Commonly, the size of the sensing window is sufficiently large to roughly cover the longest possible booking (in terms of basic periods). In the example in FIG. 1, the sensing window is chosen to consist of 4 basic periods. In the remainder of this disclosure, the expressions "sensing over the entire window" and "sensing over the whole window" refer to performing the sensing operation using the largest possible window size (i.e., the largest window size that the system allows for).

It is noted that in this example and in the rest of this disclosure, UEs may or may not operate using a common division of the time in terms of basic periods. That is, time may be divided into "basic periods" in the same way for all UEs or, alternatively, different UEs may have different divisions of time into "basic periods".

Problems with Existing Solutions

In the present disclosure, it is realized that in systems with long sensing windows, there is a large energy consumption associated with operating the UE to sense booking related message signaling from other UEs. In addition, large sensing windows may require the UE to perform quickly complex operations. This may be problematic for some types of UEs that are subject to restrictions on capabilities and/or energy, e.g., pedestrian carried or worn UEs.

One alternative with lower energy consumption and complexity that has been discussed in 3GPP is to perform sensing over only the last part of the time window, for example sensing over the last basic period, as illustrated in FIG. 2. Sensing over the last part of the time window, referred to in FIG. 2 as a reduced sensing window, of the whole/entire sensing window may not be able to detect all the relevant booking messages and/or unhooking messages transmitted by UEs since such signaling may not occur in the reduced sensing window. For example, in FIG. 2, UE3 cannot receive the booking message transmitted by UE 1 since the message is transmitted at time ta, where time ta is less than tc−T. Similarly, the sensing window of UE3 does not contain the time at which the booking message by UE2 is transmitted.

Some of the sensing-based resource allocation algorithms discussed in 3GPP make a prediction on the availability of radio resources by taking averages (or other operations) of measurements in the past. For example, to estimate the load level of a certain radio resource at a future time t+tc, the sensing takes the average of the measured load at times t+tc−T, t+tc−2T, t+tc−3T, etc. The UE may then control timing of its sensing based on the prediction, the effectiveness of which is affected by the quality of the estimates.

Thus, sensing using entire windows has a high associated energy consumption whereas sensing using less than the entire window, i.e. over only the last part of the time window, has an associated degradation in performance affecting all users in the system (due to collisions of transmissions).

SUMMARY

Some embodiments of the present disclosure are directed to a method by a first user equipment for selecting a radio resource for transmitting a packet. The method includes obtaining a basic period value related to expected timing of transmissions by a second UE. A sub-period value is obtained that is less than the basic period value. Radio resources are monitored for a packet or booking message that is transmitted by the second UE and indicates that the second UE will potentially transmit a next packet using a radio resource and timing. The monitoring is restricted to a timeframe determined based on the sub-period value within each occurrence of a time period determined based on the basic period value. Responsive to the monitoring identifying the packet or booking message, a radio resource is selected for use in transmitting a packet based on the radio resource and timing that is potentially to be used by the second UE to transmit the next packet.

A potential advantage of the recited method is that the monitoring is restricted to occurring during the relatively brief timeframe that is determined based on the sub-period value within each time period. Substantial UE power savings and reduction in computational bandwidth consumption for the monitoring may thereby be achieved. The sub-period value can be defined to cause the monitoring to occur at a location in each time period that will enable the UE to sense the packet or booking message transmitted by the other UE.

Some other related embodiments are directed to a UE that selects a radio resource for transmitting a packet. The UE includes a radio transceiver, at least one processor, and at least one memory coupled to the at least one processor and the radio transceiver, and storing program code that when executed by the at least one processor causes the at least one processor to perform operations. The operations include obtaining a basic period value related to expected timing of transmissions by a second UE, obtaining a sub-period value that is less than the basic period value, and monitoring radio resources for a packet or booking message that is transmitted by the second UE and indicates that the second UE will potentially transmit a next packet using a radio resource and timing. The monitoring is restricted to a timeframe determined based on the sub-period value within each occurrence of a time period determined based on the basic period value. Responsive to the monitoring identifying the packet or booking message, the operations select a radio resource for use in transmitting a packet through the radio transceiver based on the radio resource and timing that is potentially to be used by the second UE to transmit the next packet.

Some other related embodiments are directed to another UE that is configured to obtain a basic period value related to expected timing of transmissions by a second UE, obtain a sub-period value that is less than the basic period value, monitor radio resources for a packet or booking message that is transmitted by the second UE and indicates that the second UE will potentially transmit a next packet using a radio resource and timing, and, responsive to the monitoring identifying the packet or booking message, select a radio resource for use in transmitting a packet based on the radio resource and timing that is potentially to be used by the second UE to transmit the next packet. The monitoring is restricted to a timeframe determined based on the sub-period value within each occurrence of a time period determined based on the basic period value.

Some other related embodiments are directed to a computer program product for selecting a radio resource to be used by a user equipment to transmit a packet. The computer program product includes a non-transitory computer readable medium storing program code that when executed by at least one processor of the user equipment causes the at least one processor to perform operations. The operations include obtaining a basic period value related to expected timing of transmissions by a second UE, obtaining a sub-period value that is less than the basic period value, monitoring radio resources for a packet or booking message that is transmitted by the second UE and indicates that the second UE will potentially transmit a next packet using a radio resource and timing, and responsive to the monitoring identifying the packet or booking message, selecting a radio resource for use in transmitting a packet based on the radio resource and timing that is potentially to be used by the second UE to transmit the next packet. The monitoring is restricted to a timeframe determined based on the sub-period value within each occurrence of a time period determined based on the basic period value.

BRIEF DESCRIPTION OF THE DRAWINGS

The accompanying drawings, which are included to provide a further understanding of the invention and are incorporated in and constitute a part of this application, illustrate certain embodiments of the invention. In the drawings:

FIG. 5-8 are operation timing diagrams illustrating some sensing windows operations and methods that can be performed by a UE in accordance with various embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Figure 3:
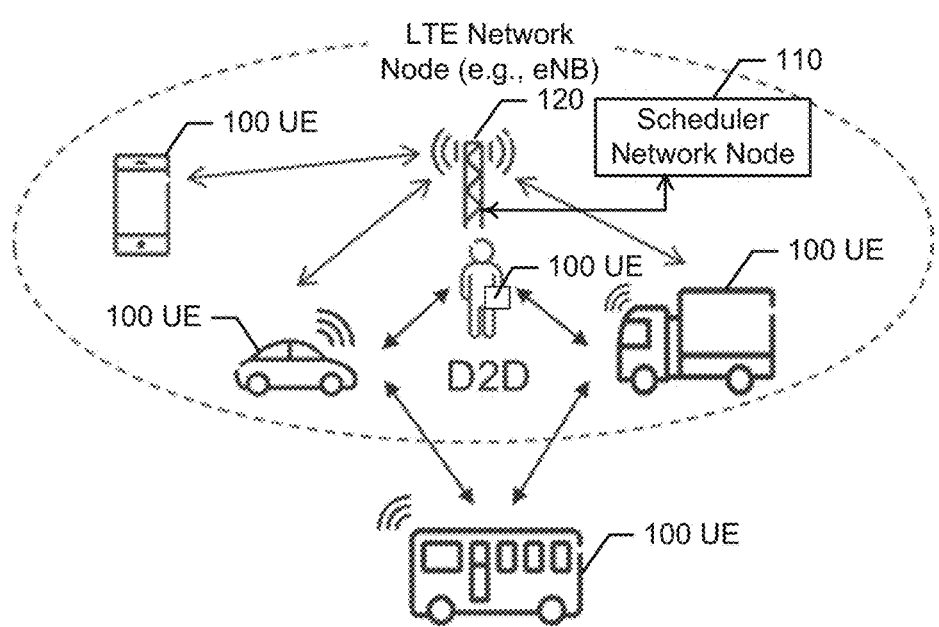
FIG. 3 illustrates a block diagram of a communication system that includes UEs configured for V2x communication of packets using radio resource allocation by limited sensing operations in accordance with various embodiments of the present disclosure.

Embodiments of the present disclosure are described without limitation in the context of a communication system shown in the block diagram of FIG. 3. The communication system includes UEs that are configured for V2x communication of packets using radio resource allocation by limited sensing operations in accordance with various embodiments of the present disclosure. The communication system includes a radio network node 120 (e.g., a LTE eNB), a scheduler network node 110 (e.g., an eNB scheduler), and a plurality of UEs 100. The UEs 100 can be any type of electronic device configured for D2D and/or V2x communications such as any one or more of: vehicle-to-infrastructure (V2I) communications; vehicle-to-pedestrian (V2P) communications; and vehicle-to-vehicle (V2V) communications. As used herein, D2D is referred to in a broader sense to include communications between any type of UEs, and includes V2x communications between a vehicle and any other type of UE. Example types of a UE 100 include, but not limited to, a personal data assistant (PDA), tablet computer (e.g., iPAD), mobile terminal, smart phone, smart watch, laptop embedded equipped (LEE), laptop mounted equipment (LME), vehicle mounted communication device, infrastructure mounted communication device, etc.

Although various embodiments are explained in the context of V2x communications, these embodiments can also be used for x2V communications. Accordingly, each use of the term "V2x" herein can be replaced with the term "x2V". Similarly, these embodiments can be used for other types of device to device communications, including D2D. Accordingly, each use of the term "V2x" herein can be replaced with the term "D2D". Thus, use of the term "sidelink" can refer to communications performed by D2D, V2x, x2V, etc. The term sidelink is used in the 3GPP specifications to refer to the transmission of messages directly between UEs; that is, without passing through an eNB. Sidelink is used for realizing D2D communications, V2x and x2V communications, ProSe (Proximity Services), etc. In LTE, sidelink communications take place over the PC5 interface, whereas cellular communications (i.e., uplink and downlink) take place over the Uu interface.

Various embodiments of the present disclosure are directed to methods and operations for distributed resource selection with reduced energy consumption and reduced complexity. Some methods and operations according to present embodiments sense booking information over only parts of an entire sensing window in a way that allows the sensing UE 100 to acquire complete booking information using a fraction of the radio resources that are otherwise used to sense the booking information over the entire sensing window. The booking information may then be used by the sensing UE 100 to select or reselect radio resources for its own transmissions, e.g., V2x transmissions to another UE. Although various embodiments are described below in the context of selection of radio resources for use in transmitting a packet, it is to be understood that those embodiments may similarly be used to reselect those radio resources for use in transmitting a packet. Moreover, for brevity some of the operations described herein only describe sensing (receiving) and using "booking" messages although it is to be understood that these operations may be performed to sense (receive) and use "unbooking" messages.

Potential Advantages of Various Embodiments

At least some embodiments allow a sensing UE 100 to perform sensing (receiving) of booking messages using a limited sensing window that is smaller than the entire sensing window which may extend over more than one basic period T, without missing (not receiving) relevant booking information (e.g., booking/unbooking messages) transmitted by other UEs 100. As explained above, the basic period T is the minimum time between two recurrent transmissions by a UE. Compared to sensing over the entire sensing window, embodiments disclosed below can reduce energy consumption by the sensing UE 100 and reduce operational sensing capability requirements on the sensing UE's 100. Moreover, these embodiments can yield better performance through the detection of (more) relevant booking messages and/or unbooking messages. This allows for transmission in the same group of radio resources by UEs 100 that perform sensing of booking messages only within the limited sensing windows and by UEs 100 that perform the sensing of booking messages over the entire sensing window defined by the basic period T, which is advantageous from a system management point of view since it avoids fragmentation of the radio resources.

Resource Allocation Using Limited Sensing by UEs According to Some Embodiments At least some embodiments disclosed herein cause UEs to operate with reduced energy consumption relative to some prior art approaches discussed above. Reducing energy consumption can be particularly important for UEs having restrictions on capabilities and/or energy, e.g., pedestrian carried or worn UEs.

Figure 4:
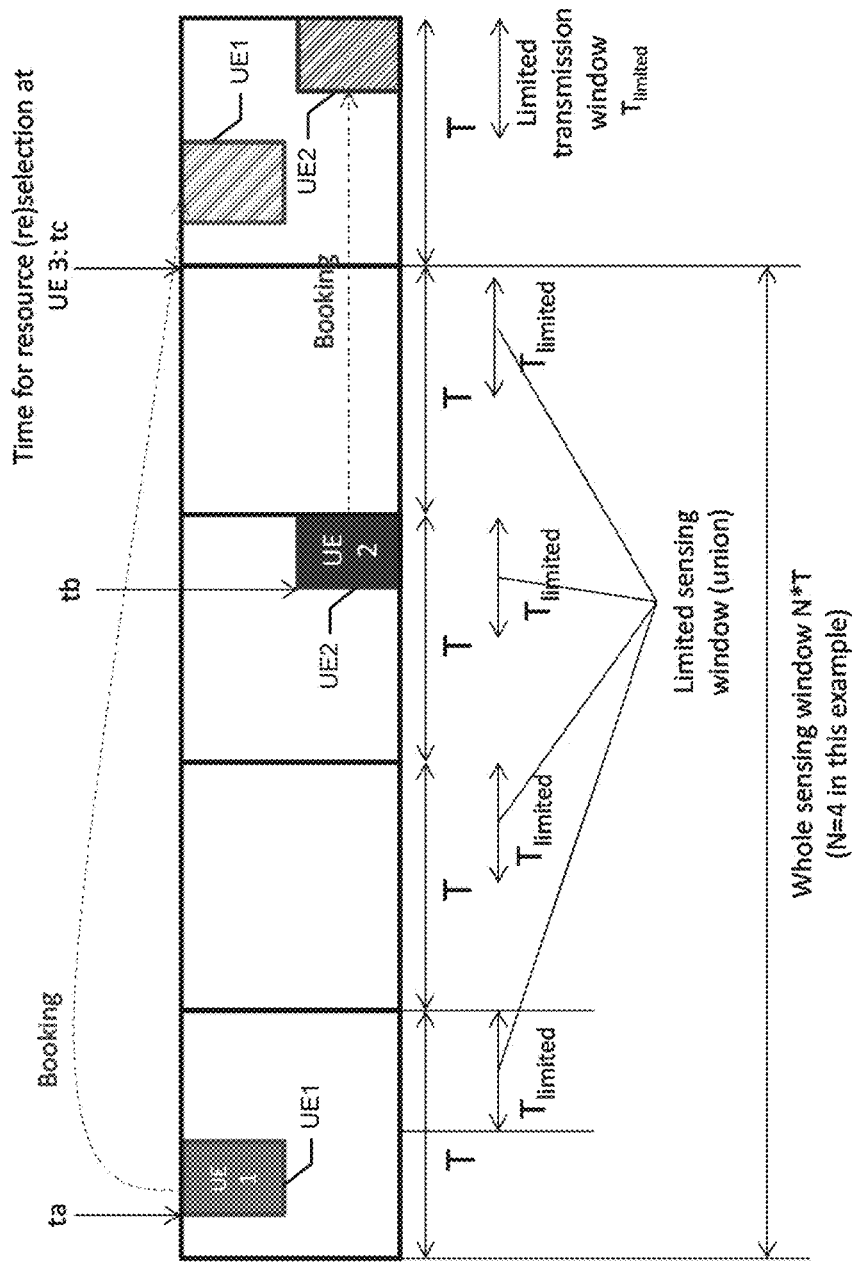
FIG. 4 is an operation timing diagram illustrating operations by UEs for resource allocation using limited sensing according to some embodiments of the present disclosure.

Some embodiments are directed to methods by UEs for distributed resource selection using sensing of booking messages and/or unbooking messages within limited sensing windows that are smaller than the entire sensing window. Some methods include operating a UE to sense booking messages and/or unbooking messages, which are transmitted by other UEs, over all basic periods that span the entire sensing window but only over a subset of the resources in each basic period, by shifting over time the location of a limited sensing window within the entire sensing windowing. FIG. 4 is an operation timing diagram that illustrates a sensing-based resource selection mechanism with booking operations by UEs (100) according to some embodiments of the present disclosure. UE1 transmits a packet at time to and meanwhile books, e.g., transmits a booking message indicating, its intention to transmit the next packet at time ta+4T. Similarly, UE2 transmits a packet at time tb and meanwhile books, e.g., transmits a booking message indicating, its intention to transmit the next packet at time tb+2T. At time tc, UE3 wants to select or reselect a radio resource for its transmission within the time window [tc,tc+T]. UE3 repeatedly monitors a set of radio resources that occur every T seconds. This set of resources is smaller than the set of all resources included in the entire sensing window having the basic period T. For example in FIG. 4, UE3 monitors the radio resources during the intervals (tc−$T_{limited}$,tc), (tc−$T_{limited}$−T,tc−T), (tc−$T_{limited}$−2T,tc−2T), and (tc−$T_{limited}$−3T, tc−3T). This allows UE3 to detect bookings that affect the (future) resources during the interval (tc−$T_{limited}$+T,tc+T). That is, UE3 has the same knowledge about the future utilization of the resources in the interval (tc−$T_{limited}$+T,tc+ T) that it would have acquired had it had performed sensing over the entire sensing window.

The "limited sensing window" has a shorter time duration than the entire sensing window having the basic period T. A UE is referred to as performing "limited sensing" when it only monitors for booking messages within a limited sensing window within an entire sensing window and, in other words, does not monitor for booking messages at other times in the entire sensing window that are outside the limited sensing window.

In FIG. 4, the fraction of the resources of a limited sensing window, which is within a basic period, that is monitored by UE3 is illustrated as being contiguous in time. However, this fraction of resources may be a collection of disjoint time-frequency resources or any other partition of the resources. For example, in an LTE system, limited sensing may be performed over an arbitrary subset of resource blocks (RBs).

Although it is not illustrated in FIG. 4, the different transmissions and the associated bookings may include retransmissions.

Figures 10, 11:
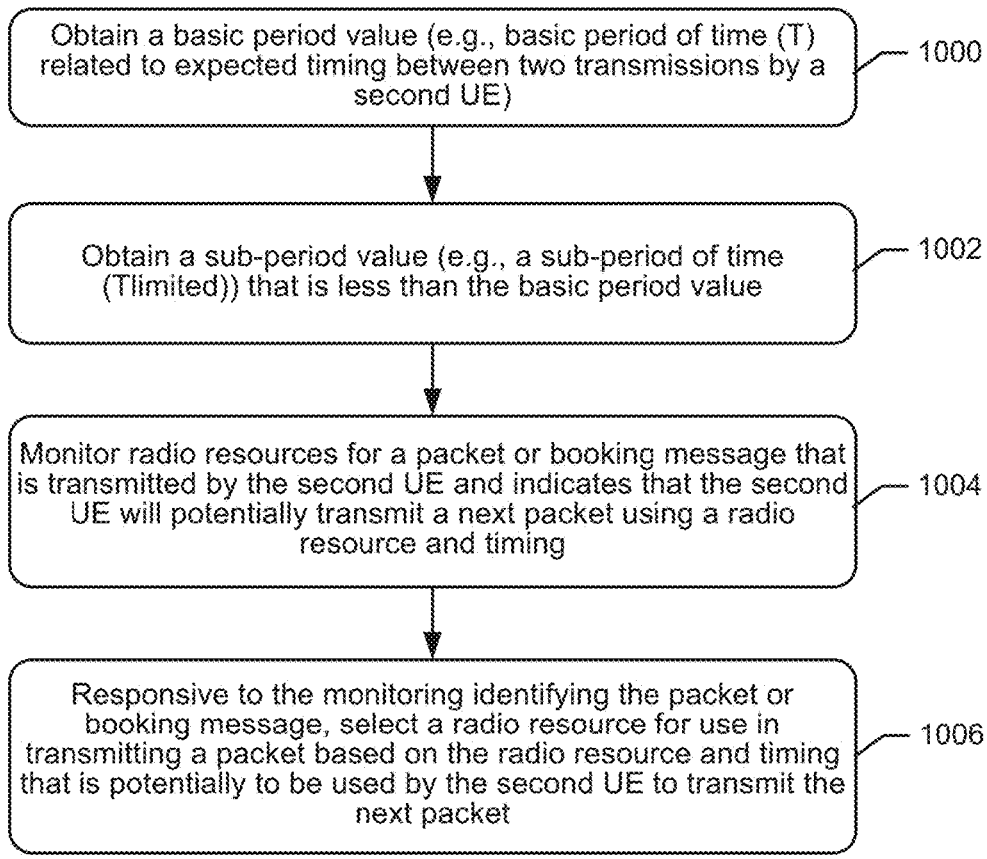

FIG. 10 is a flowchart of a corresponding method and operations by a first UE (100) for V2x communication of packets, and which may provide the operations shown for UE3 in FIG. 4.

Referring to FIG. 10, the first UE 100 obtains (block 1000) a basic period value related to expected timing of transmissions by a second UE (100), and obtains (block 1002) a sub-period value that is less than the basic period value.

In one embodiment of FIG. 4, the basic period value defines a basic period of time (T) that is a minimum time between two recurrent transmissions by the second UE 100. The sub-period value defines a sub-period of time, illustrated as the limited sensing window (Tlimited), that is less than the basic period of time (T). The basic period of time (T) may be the minimum time between transmission of a packet or booking message by the second UE 100 and a subsequent transmission by the second UE 100. For convenience, the terms "sub-period of time" and "limited sensing window" are used interchangeably below.

In another embodiment, the basic period value is a minimum number of subframes that is expected to occur between two transmissions by the second UE, where the sub-period value corresponds to fewer subframes than the minimum number of subframes.

In another embodiment, the basic period of time corresponds to a defined number of subframes.

The first UE 100 monitors (block 1004) radio resources for a packet or booking message that is transmitted by the second UE 100 and indicates that the second UE 100 will potentially transmit a next packet using a radio resource and timing. The first UE 100 operates to restrict the monitoring to a timeframe determined based on the sub-period value within each occurrence of a time period determined based on the basic period value. Responsive to the monitoring identifying the packet or booking message, the first UE 100 selects (block 1006) a radio resource for use in transmitting a packet based on the radio resource and timing that is potentially to be used by the second UE 100 to transmit the next packet.

The monitoring (block 1004) can include receiving and decoding the packet booking message and/or can include sensing energy that corresponds to a signal transmitted by the second UE 100 without decoding content of what is being transmitted. The monitoring (block 1004) may, for example, include determining when the energy received through monitored radio resource(s) satisfies a defined rule, such as when the energy exceeds a threshold value. The threshold value, when used, may be based on an average of the energy received during one or more such monitoring operations.

In one embodiment, the monitoring is restricted to the timeframe that is determined based on the sub-period value and occurs immediately adjacent but prior to a resource selection timing or resource reselection timing. In a further embodiment, the monitoring is restricted to a same location of the timeframe prior to each occurrence of the resource selection timing or resource reselection timing.

As will be explained in further detail below, a location of the sub-period of time (e.g., limited sensing window of FIG. 4) and a part of the radio frequency spectrum that can be used during the monitoring (block 1004) may be controlled to change between at least some repetitions of the monitoring (block 1004) according to a defined rule.

Further Embodiments

In some embodiments, the UE uses the outcome of limited sensing to make a resource selection or reselection. The selected resource is one of the resources for which limited sensing delivers future utilization information. In the example in FIG. 4 this would be a resource in the interval (tc−Tlimited+T,tc+T).

In some further embodiments, the selected or reselected resource may be used by the UE for transmission. That is, the resources for transmission belong to a limited transmission window. FIG. 11 illustrates a corresponding flowchart of a method and operations that can be performed by the first UE 100 of FIG. 10. Referring to FIG. 11, the first UE 100 transmits (block 1100) the packet through a transmitter circuit of the first UE 100 using the radio resource that is selected. The radio resource used for the transmitting (block 1100) can be selected to be among frequencies of the periodic repetitions of the radio resources that were monitored. The radio resource used for the transmitting (block 1100) can be selected to be among the radio resources that were monitored (block 1004) but further selected to be different from a radio resource that was used for a last transmission by the first UE 100 before a present resource reselection operation.

In some embodiments, the UE performing limited sensing changes what resources it uses to monitor the limited sensing window (sub-period of time) over time (e.g., in a periodic manner, based on conditions, etc.). The resources that are used by the UE to monitor the limited sensing window may be changed by varying the timing location of the limited sensing window and/or by varying the radio frequency spectrum that is monitored in the limited sensing window. For example, the UE may use a first limited sensing window N times, then change to a second limited sensing window and use it N times, then change to a third limited sensing window and use it N times, and so on. The timing location and/or radio frequency spectrum that the UE uses can be different between each of the first, second, third, and so on limited sensing windows. The number of repeated uses of the selected limited sensing window (N) may change between the different limited sensing windows (e.g., use the first limited sensing window N1 times, then use the second limited sensing window N2 times, etc.). This ensures that the load due to a UE performing limited sensing is distributed over all the existing resources available within the entire sensing window over time. New limited sensing windows may be chosen in a random manner, chosen following a defined pattern, chosen in a cyclic shift manner, or in any other way. This includes the cases where different parts of the spectrum are sensed at different times which may further reduce UE energy consumption.

Some sensing windows operations and methods that can be performed by the UE 100 are shown in FIG. 5 to FIG. 8, where the entire sensing window is split in a subset of subframes (or frequencies) to be sensed. In FIG. 5 to FIG. 8 the horizontal axis represents time and the vertical axis represents frequency spectrum used by a sensing UE to sense signals from other UEs.

Figure 12:
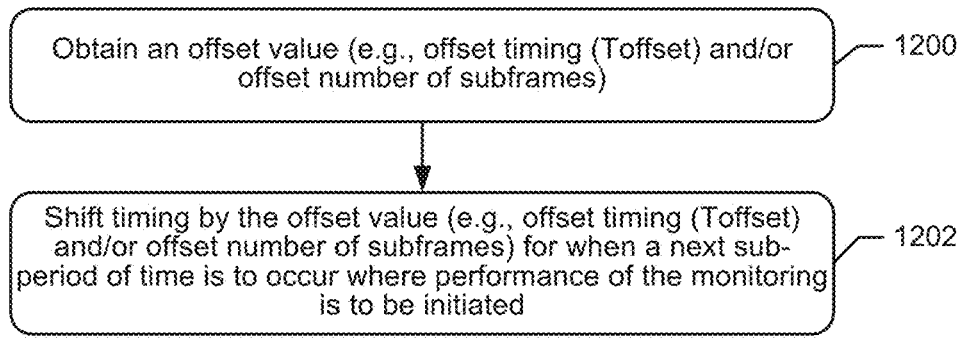
Figure 13:
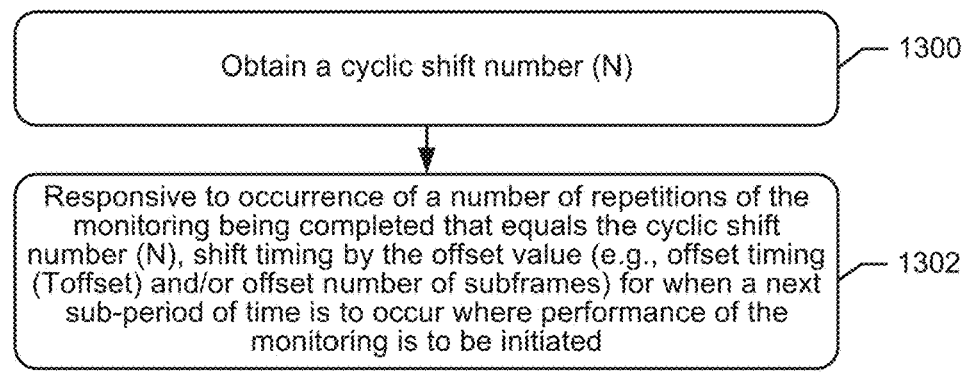

In FIG. 5, timing locations of the limited sensing windows or sub-periods of time (i.e. illustrated as Tlimited) are cyclically shifted after a certain N times. FIGS. 12 and 13 illustrate corresponding flowcharts of methods and operations that can be performed by the first UE 100 of FIG. 10 to operate according to FIG. 5. Referring to FIGS. 5, 12, and 13, the first UE 100 controls the monitoring (1004) to change locations of limited sensing windows (sub-periods of time) between at least some repetitions of the monitoring (1004) in different ones of basic periods of time according to a defined rule. Operations for controlling the monitoring (1004) can include obtaining (block 1200) an offset value, and then shifting timing (block 1202) by the offset value for when a next sub-period of time (illustrated as Tlimited) is to occur where performance of the monitoring is to be initiated. The offset value may be an offset timing (Toffset) relative to a timing reference and/or may be an offset number of subframes. In a further embodiment, the first UE 100 also obtains (block 1300) a cyclic shift number (N). Responsive to occurrence of a number of repetitions of the monitoring being completed that equals the cyclic shift number (N), the first UE 100 shifts timing (block 1302) by the offset value (e.g., the offset timing (Toffset) and/or the offset number of subframes) for when the next sub-period of time is to occur where performance of the monitoring is to be initiated.

Figure 15:
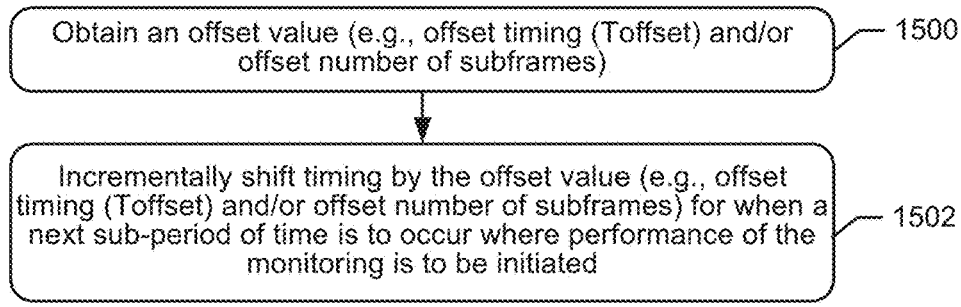
Figure 16:
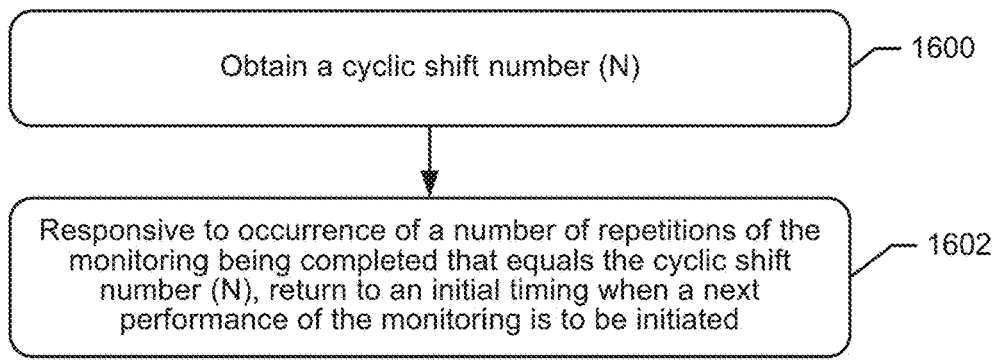

In FIG. 6, within an entire sensing window, subframes (Tlimited) representing sub-periods of time that are sensed, are cyclically shifted. FIGS. 15 and 16 illustrate corresponding flowcharts of methods and operations that can performed by the first UE 100 of FIG. 10 to operate according to FIG. 6. Referring to FIGS. 6, 15, and 16, the first UE 100 obtains (block 1500) an offset value (e.g., offset timing (Toffset) relative to a timing reference and/or an offset number of subframes), and incrementally shifts timing (block 1502) by the offset value (e.g., offset timing (Toffset) and/or offset number of subframes) for when a next sub-period of time is to occur where performance of the monitoring is to be initiated.

In a further embodiment, the first UE 100 changes the timing location of subframes between at least some repetitions of the monitoring (1004) in different frames of entire sensing windows, based on obtaining (block 1600) a cyclic shift number (N). Responsive to occurrence of a number of repetitions of the monitoring being completed that equals the cyclic shift number (N), the first UE 100 returns (block 1602) to an initial timing when a next performance of the monitoring is to be initiated.

Figure 7:
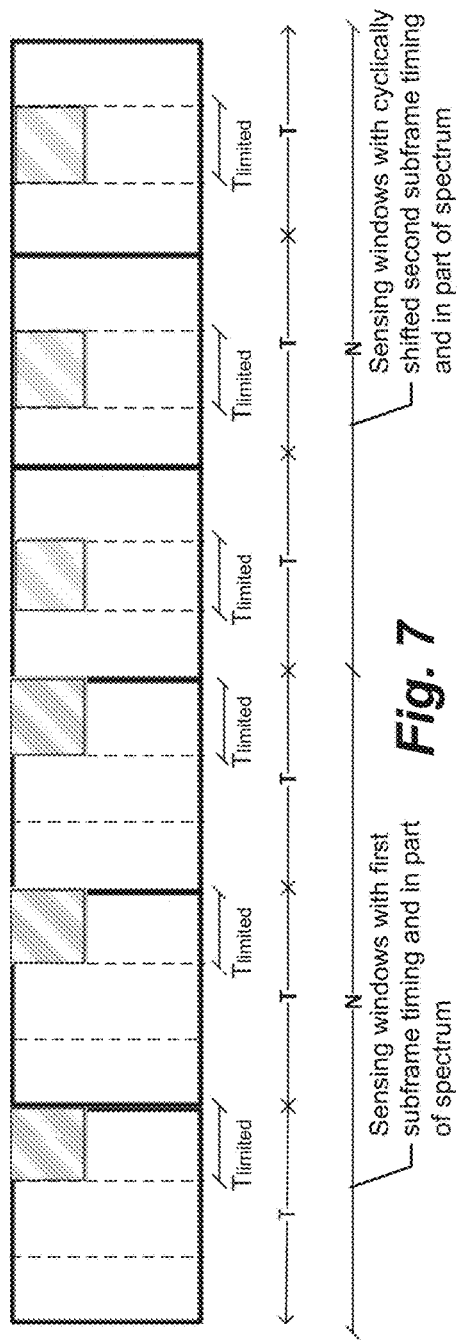
Figure 14:
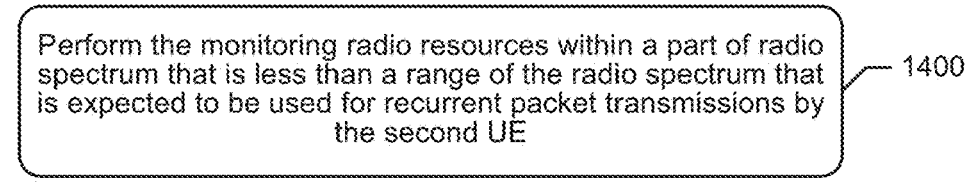

In FIG. 7, the entire sensing windows have subframes defined in a certain part of the radio frequency spectrum which are cyclically shifted from one entire sensing window to another. FIG. 14 illustrates a corresponding flowchart of a method and operations that can performed by the first UE 100 of FIG. 10 to operate according to FIG. 7. Referring to FIGS. 7 and 14, the first UE 100 performs (block 1400) the monitoring of radio resources within a part of radio spectrum that is less than a range of the radio spectrum that is expected to be used for recurrent packet transmissions by the second UE 100.

Figure 8:
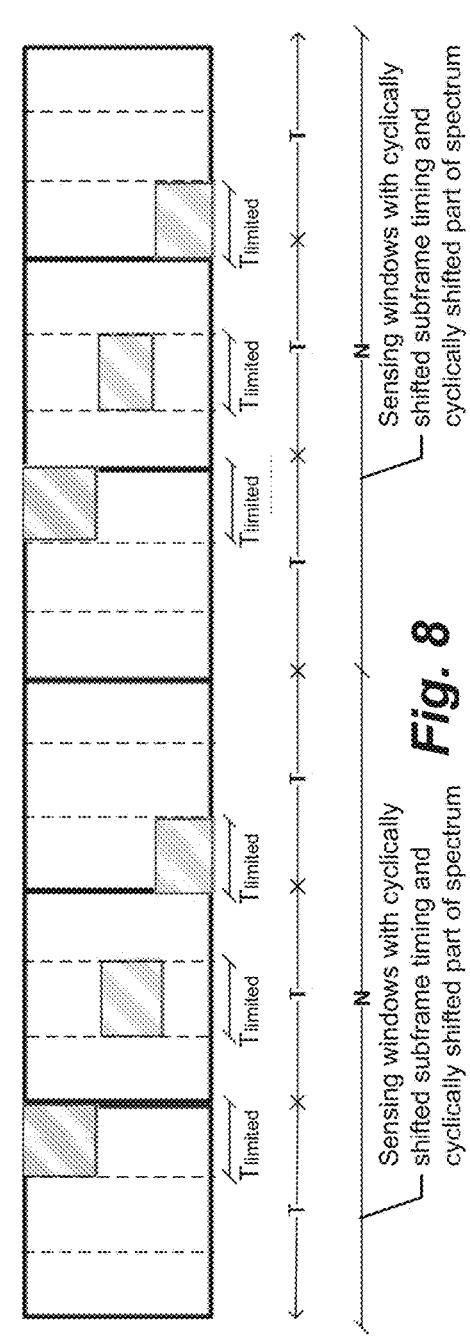
Figure 17:
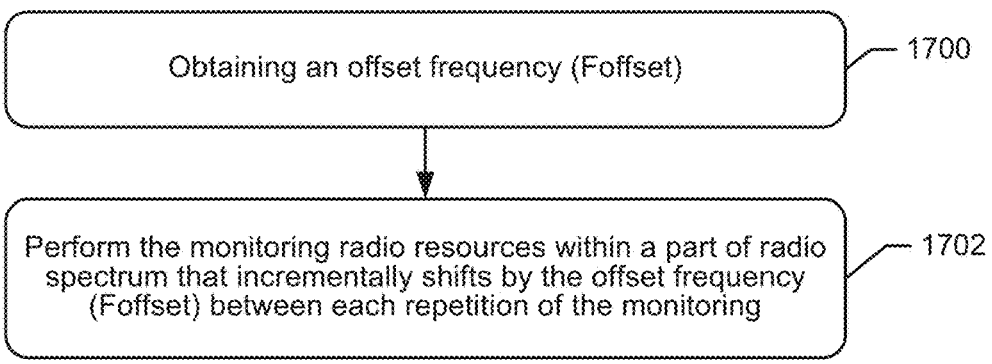
Figure 18:
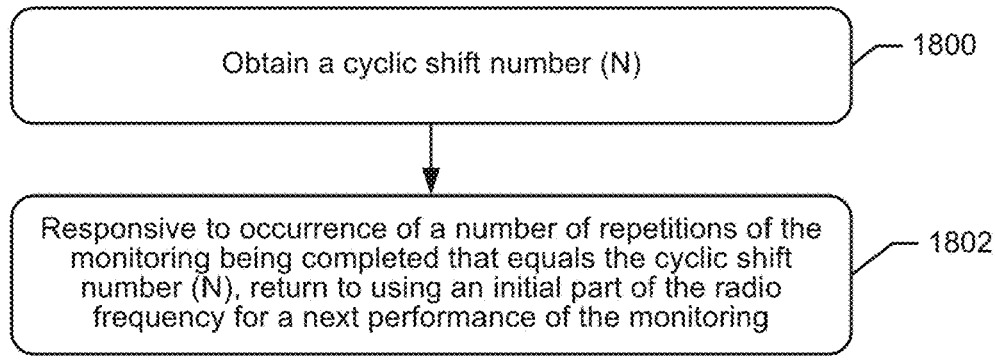

In FIG. 8, the limited sensing windows within different entire sensing windows having different parts of the radio frequency spectrum that are sensed cyclically by the UE to monitor, e.g., for booking messages. FIG. 17 illustrates a corresponding flowchart of a method and operations that can performed by the first UE 100 of FIG. 10 to operate according to FIG. 8. Referring to FIGS. 8 and 17, the first UE 100 obtains (block 1700) an offset frequency (Foffset), and performs (block 1702) the monitoring of radio resources within a part of radio spectrum that incrementally shifts by the offset frequency (Foffset) between each repetition of the monitoring. In the further embodiment of FIG. 18, the first UE 100 obtains (block 1800) a cyclic shift number (N). Responsive to occurrence of a number of repetitions of the monitoring being completed that equals the cyclic shift number (N), the first UE 100 returns (block 1802) to using an initial part of the radio frequency for a next performance of the monitoring.

Figure 9:
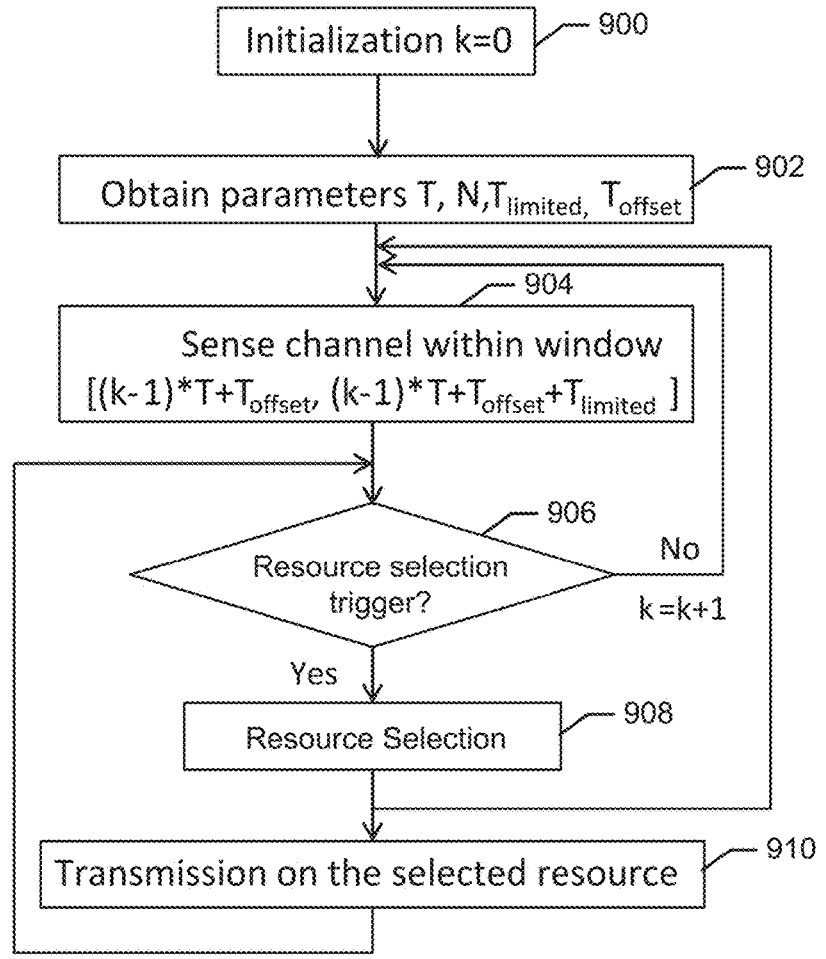
FIGS. 9-18 are flowcharts of operations and methods that are performed by a UE in accordance with various embodiments of the present disclosure.

FIG. 9 is a flowchart of a method and operations that can be performed by a UE 100 according to a combination of some of the embodiments disclosed above for FIGS. 10-18. Referring to FIG. 9, the UE 100 initializes (block 900) a counter k to zero. The UE 100 obtains (block 902) parameter values defining: 1) the basic period value (e.g., basic period of time (T) and/or the number of subframes) that is expected to occur between two recurrent packet transmissions by another UE; 2) the cyclic shift number (N); 3) the sub-period value (e.g., sub-period of time (Tlimited) and/or number of subframes) that is less than the basic period value; and 4) the offset value (e.g., offset timing (Toffset) and/or offset number of subframes). In one embodiment when the UE 100 obtains a basic period of time (T), an offset timing (Toffset), and a sub-period of time (Tlimited), the UE 100 senses (block 904) the channel within a window defined by the range [(k−1)*T+Toffset,(k−1)*T+Toffset+Tlimited].

The UE 100 determines (block 906) whether a selection trigger has been received. If not, the counter K is incremented and operations loop back to again sense (block 904) the channel window. Otherwise, if a selection trigger has been received, a resource selection is performed (block 908) and a packet is transmitted (block 904) on the selected resource.

In some embodiments, (some or all of) the parameters required for limited sensing are preconfigured in the UE, obtained from another UE, and/or obtained from a network node, such as from the scheduler network node 110 shown in FIG. 3. In some other embodiments, (some or all of) the parameters are configured by a network node, such as by the scheduler network node 110 shown in FIG. 3, to control a UE through signaling from the network node to the UE. Accordingly, the UE can receive signaling from a network node that indicates one or more sensing parameters that is used by the UE to determine any one or more of the basic period value, the cyclic shift number, the sub-period value, and the offset value.

In some other embodiments, some or all of the parameters are chosen autonomously by the UE, which can include any one or more of the following operations which may be performed alone or in any combination with any one or more other operations explained blow.

In one embodiment, the UE chooses the sensing parameters as a function of its energy constraints (e.g., smaller limited window with low battery). Accordingly, the UE may determine the sub-period value (e.g., sub-period of time (Tlimited) and/or number of subframes) based on a remaining battery life of a battery of the UE. The sub-period value may be reduced responsive to determining that the remaining battery life has fallen below a threshold level.

In another embodiment, the UE chooses the sensing parameters as a function of communication loading of the radio resources being monitored or congestion. System communication loading or congestion may be determined by the UE or may be signaled by some other node, e.g., the node 110 of FIG. 3. For example, the UE may choose a larger limited sensing window (i.e., sub-period of time (Tlimited) and/or number of subframes) when the system is determined to be highly loaded, e.g., the radio resources being monitored have more than a threshold level of utilization, (to avoid degradation). In contrast, the UE may choose a smaller limited sensing window (i.e., sub-period of time (Tlimited) and/or number of subframes) when the system is determined to be lightly loaded, e.g., the radio resources being monitored have less than the threshold level of utilization. In a further embodiment, the UE increases the sub-period of time (Tlimited and/or number of subframes) based on determining that communication loading is above a defined threshold, and decreases the sub-period of time (Tlimited and/or number of subframes) based on determining that communication loading is below the defined threshold.

In another embodiment, the UE chooses the sensing parameters as a function of the type of traffic (e.g., urgent, best-effort) that is to be transmitted or any of the parameters related to the transmission (bandwidth, transmission format, power, etc.). For example, the UE may choose a larger limited sensing window (i.e., sub-period value, such as sub-period of time (Tlimited) and/or number of subframes) when urgent traffic is to be transmitted. In contrast, the UE may choose a smaller limited sensing window (i.e., sub-period value, such as sub-period of time (Tlimited) and/or number of subframes) when best-effort traffic is to be transmitted. In a further embodiment, the UE determines the sub-period value (e.g., sub-period of time (Tlimited) and/or number of subframes) based on priority of the type of traffic that is to be transmitted. In still a further embodiment, the UE increases the sub-period value (e.g., sub-period of time (Tlimited) and/or number of subframes) based on determining that urgent traffic is to be transmitted, and decreases the sub-period value (e.g., sub-period of time (Tlimited) and/or number of subframes) based on determining that best-effort traffic is to be transmitted.

In another embodiment, the UE chooses the sensing parameters as a function of some system settings. For example, transmission on different resource pools may be done using different parameters. Or the parameters may be chosen based on the synchronization reference or type used by the UE.

In another embodiment, the UE chooses the sensing parameters on the basis of the transmitting pool provided by the network for the specific traffic type (e.g. V2P), or priority, or geographical location of the UE. In this case the sensing windows only consist of subframes/frequencies belonging to such transmitting pool and the sensing parameters may be specific for such pool. In a further embodiment, the UE determines the sub-period value (e.g., sub-period of time (Tlimited) and/or number of subframes) based on geographical location of the UE.

In another embodiment, the UE chooses the sensing parameters as a function of its position or speed of the UE. In a further embodiment, the UE determines the sub-period value (e.g., sub-period of time (Tlimited) and/or number of subframes) based on speed of the UE.

In some embodiments, (some or all of) the parameters required for limited sensing are based on combinations of predefined values in the UE and/or operations coded in local memory of the UE for determining the values, and/or are based on predefined values defined in local memory of a network node (e.g., the scheduler network node 110 in FIG.

3) and/or operations coded in local memory of the network node for determining the values.

In another embodiment of this invention, the UE when selecting the transmitting resources does not only take into consideration the sensing resources used in the last sensing window but furthermore considers the previous sensing windows which consist of a different set of sensed resources. Sensing results from previous sensing windows may be filtered out by a forgetting factor which gives less weight to sensing results from older sensing windows.

Example User Equipment

Figure 19:
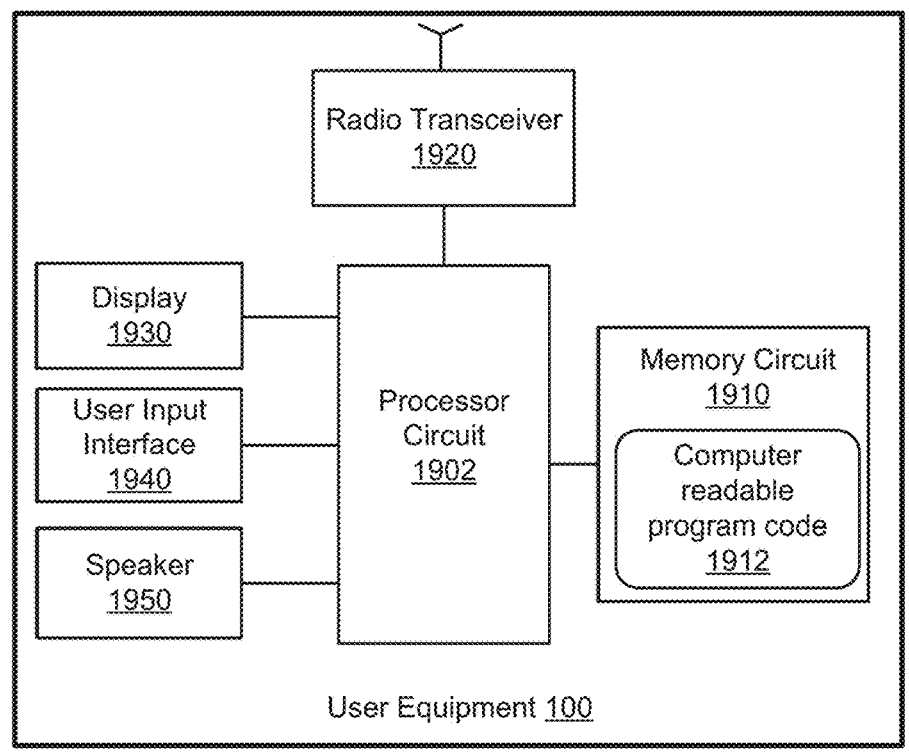
FIG. 19 is a block diagram of a UE configured according to some embodiments of the present disclosure.

FIG. 19 is a block diagram of a UE 100, for use in a telecommunications system, that is configured to perform operations according to one or more embodiments disclosed herein. The UE 100 includes a radio transceiver circuit 1920, at least one processor circuit 1902, and at least one memory circuit 1910 containing computer readable program code 1912. The UE 100 may further include a display 1920, a user input interface 1940, and a speaker 1950.

Figure 1:
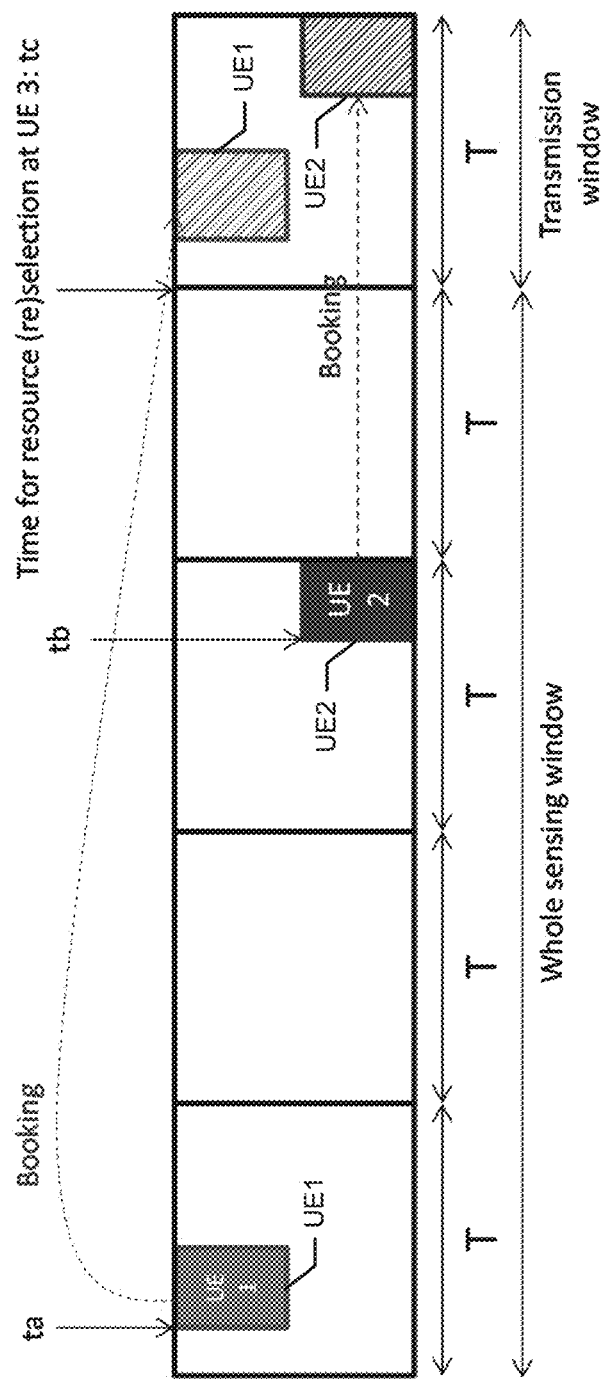
FIG. 1 is an operation timing diagram illustrating a sensing-based resource selection mechanism over a whole window and booking operations by UEs according to the prior art.
Figure 2:
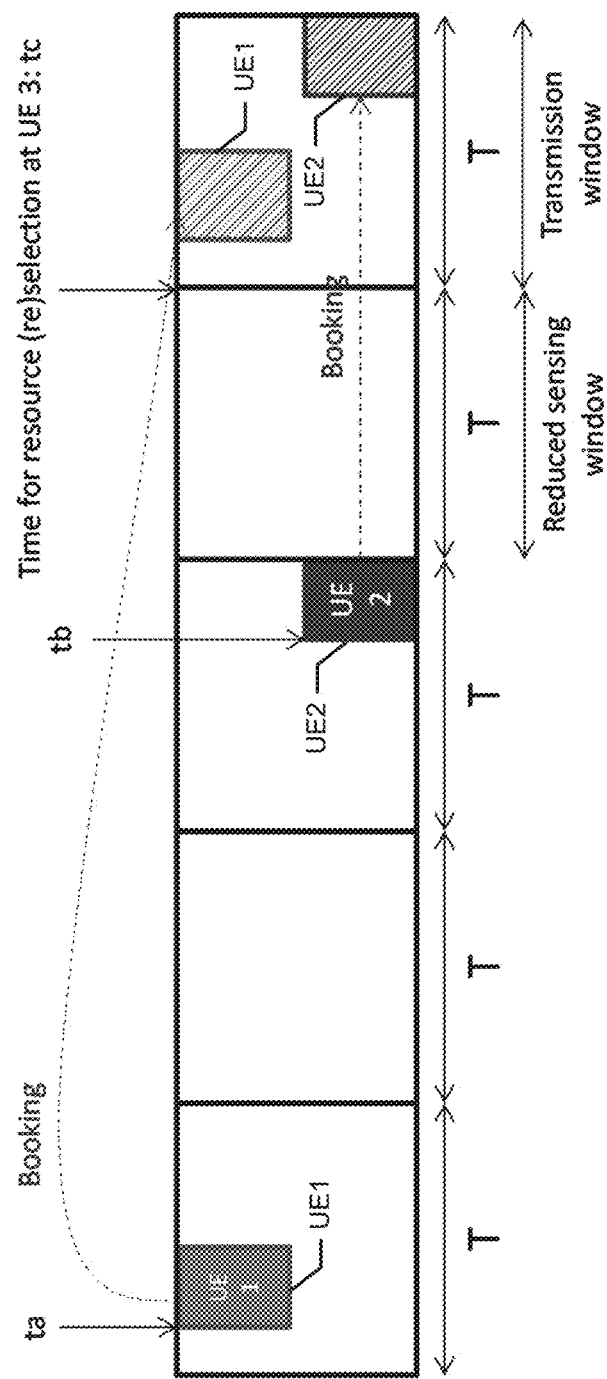
FIG. 2 is an operation timing diagram illustrating a sensing-based resource selection mechanism over less than the whole window and booking operations by UEs according to the prior art.

The transceiver 1920 is configured to communicate with other UEs, which as explained in FIG. 1 may correspond to vehicle mounted/carried devices, pedestrian carried devices, etc. and to communicate with infrastructure mounted devices (e.g., network nodes) through a wireless air interface using one or more of the radio access technologies. The processor circuit 1902 may include one or more data processing circuits, such as a general purpose and/or special purpose processor, e.g., microprocessor and/or digital signal processor. The processor circuit 1902 is configured to execute the computer readable program code 1912 in the memory circuit 1910 to perform at least some of the operations described herein as being performed by a UE 100.

Example Modules

Figure 20:
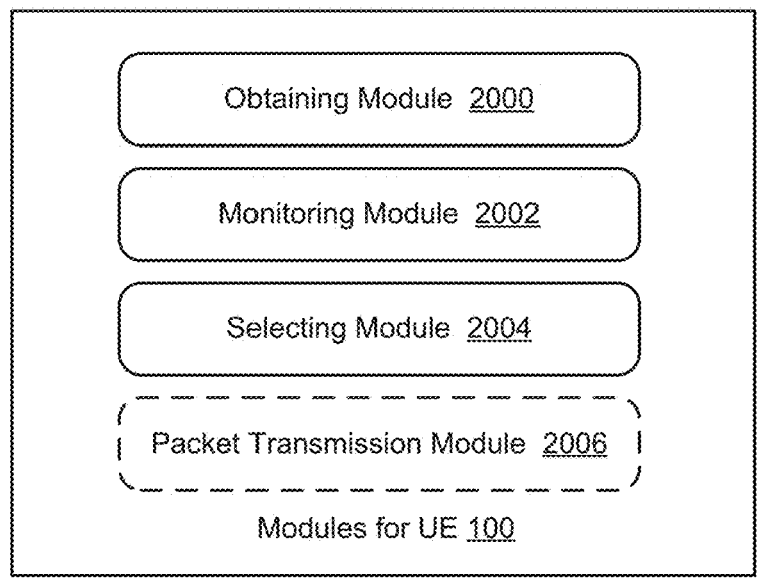
FIG. 20 illustrates modules for a UE that perform operations as disclosed herein according to some embodiments.

FIG. 20 illustrates modules for a UE 100 that perform operations as disclosed herein according to some embodiments. The modules include an obtaining module 2000, a monitoring module 2002, and a selecting module 2004. The obtaining module 2000 is for obtaining a basic period value related to expected timing of transmissions by a second UE, and for obtaining a sub-period value that is less than the basic period value. The monitoring module 2002 is for monitoring radio resources for a packet or booking message that is transmitted by the second UE and indicates that the second UE will potentially transmit a next packet using a radio resource and timing. The monitoring is restricted to a timeframe determined based on the sub-period value within each occurrence of a time period determined based on the basic period value. The selecting module 2004 is for, responsive to the monitoring identifying the packet or booking message, selecting a radio resource in transmitting a packet based on the radio resource and timing that is potentially to be used by the second UE to transmit the next packet.

The module may further include a packet transmission module 2006 that is for transmitting the packet through a transmitter circuit of the UE 100 using the radio resource that is selected.

Explanation of Further Proposed Embodiments

The V2P (vehicle-to-pedestrian) is commonly used to denote communications between UEs mounted on vehicles and handheld UEs (pedestrians, cyclists, etc.). Handheld UEs are subject to additional constraints (e.g., energy efficiency, UE complexity, etc.) when compared to UEs mounted on vehicles. For this reason, it may be necessary to consider several aspects related to communications involving handheld UEs.

When it comes to energy efficiency, it may be necessary to distinguish between transmissions originating from handheld UEs (here referred to as P2V) and transmissions from UEs on vehicles to handheld UEs (here referred to as V2P). Owing to reasons of energy consumption as well as UE complexity, it may be necessary to consider the possibility that handheld UEs implement only V2P, only P2V, or both. V2P/P2V transmissions over the PC5 and Uu interfaces are distinguished.

Below various embodiments are explained for P2x and x2P to specify enhancements for support of V2P service:
   a) Random resource selection for P-UEs potentially on the PC5 resource pool shared with V-UE transmissions, with additional study on sensing operation during a limited time for P-UEs [RAN1, RAN2]
   b) Authorization for pedestrian UEs, if necessary [RAN3, RAN2 if needed]

Details of Transmission Mode 3

It may be necessary to introduce a new transmission mode 3 for P2X with optimizations for reduced energy consumption. As in mode 2, UEs using transmission mode 3 should be able to transmit over PC5 even when in IDLE in their cell. In this way, the energy-costly process of maintaining the connection to the eNB is avoided. UEs without X2P capabilities should still be able to do P2X.

Regarding reception, a UE could monitor any of the V2X pools in order to maximize reliable and timely reception. In V2V, delay constraints are very critical to activate automated braking system or to ensure efficient cooperative adaptive cruise control. However for pedestrian devices (referred to as "pedestrians" for brevity) such delay constraints can be relaxed. Additionally, if the UE monitors the V2X pools it might receive many messages from all the UEs in the communication range which might eventually drain the battery. On the other hand, if Uu multicast reception is used, latency might be higher but the V2X AS can make sure to properly filter packets and only deliver a single warning message to the pedestrian. Therefore, also considering UE complexity, it may be useful to provide sidelink reception capabilities for pedestrians, i.e. pedestrians can monitor the Uu multicast channel to receive vehicles presence warnings.

In some embodiments:
   Introduce mode-3 as a resource selection mode that is suitable for handheld devices
      No sidelink reception capabilities required for mode-3
      IDLE operation supported
      Limited OOC operation if device does not have SS/PDSCH detection capability.

Energy consumption can be improved by avoiding the requirement for the UE to sense the radio environment for resource selection. Additional implementation-specific optimizations may be possible in the UE and should not be prevented by specification.

In terms of resource selection, a proposed embodiment provides that mode-3 follows exactly the same procedures as for mode-2, with the following exceptions:
   Mode-3 resource (re)selection is identical to Mode-2 except for the following aspects:
      The SA/data resources (re)selected as a consequence of a (re)selection trigger are chosen according to UE implementation among the allowed resources in the Mode 3 pool. It is noted that an alternative would be to explicitly recommend random selection within a certain time window.
      In case of resource reselection the UE shall not reselect a resource corresponding to the previous selection.

The reselection timer for Mode 3 should be studied further and might differ from Mode 2.

All other reselection triggers are identical to Mode 2.

In order to enable some level of congestion control even for Mode 3, one embodiment provides:

Allowed Tx format (e.g., MCS, scheduled BW and max nr of retx) for Mode 3 are (pre)configured or signaled in SIB.

UE can choose any Tx formats according to its implementation within the limits set by the eNB.

Details of Transmission Mode 2 with Reduced Sensing

UEs with reduced sensing can be configured to be able to share the same pool (or at least overlapping resources in different pools) with Mode 2 UEs with full sensing, without degrading the performance of full sensing UEs.

One option would be for a UE to sense a short time window (e.g., 100 ms) immediately preceding the reselection trigger. However, such option would not allow detection of the bookings by UEs with traffic periodicity greater than 100 ms, which is the typical case for pedestrian UEs. It is observed that Sensing over a short time window (e.g., 100 ms) immediately preceding the reselection trigger does not allow detection of colliding transmissions.

Figure 21:
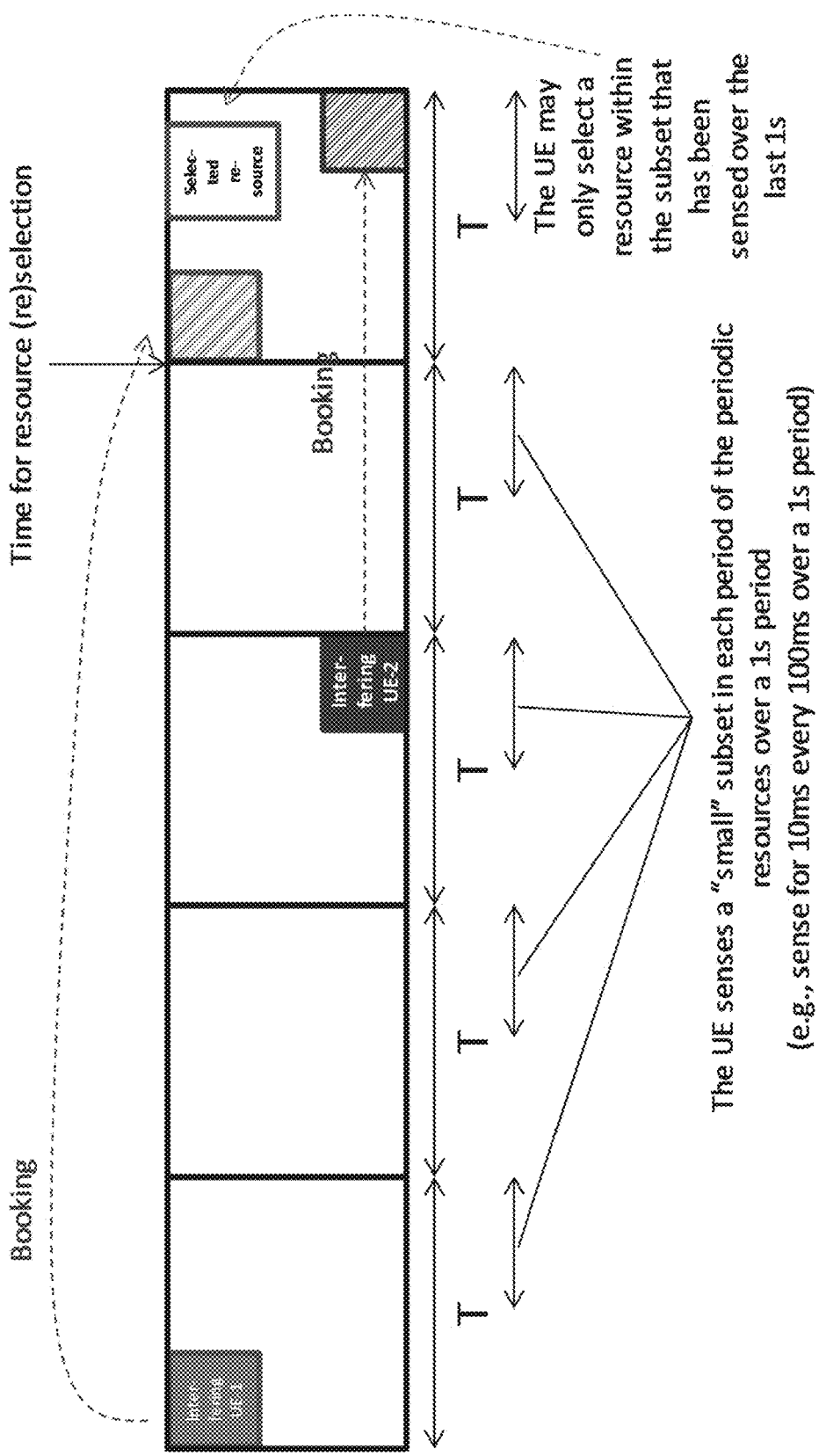
FIG. 21 is an operation timing diagram illustrating operations by UEs for resource selection or reselection with reduced sensing according to some embodiments of the present disclosure.

Some proposed embodiments instead let the UE sense the same subset (e.g., 10 ms) of the periodic resource (e.g., period T=100 ms) for a is period before reselection, as shown in FIG. 21. FIG. 21 is an operation timing diagram illustrating operations by UEs for resource selection or reselecton with reduced sensing. The UE senses a short window every, e.g., 100 ms, for the last 1 second and may select resources only within the window that has been sensed.

By doing so, the UE will gather all the bookings by all UEs that intend to transmit within the 10 ms window. Once sensing over is is completed, the UE may only (re)select resources within the sensed subset of resources.

The proposed approach has several potential benefits:

UEs with reduced sensing can share radio resources with UEs with full sensing, without affecting performance of the full sensing UEs Resource selection with reduced sensing can be implemented as part of Mode 2 with no/minor specification impact. It is up to UE implementation whether to restrict sensing (and scheduling freedom) to a fraction of the resources.

The periodic sensing window can be shifted and it doesn't even need to be continuous in time. These details may be left to UE implementation.

Based on the above some embodiments disclosed herein include the following:

If reduced sensing is supported:

Reduced sensing is a special case of Mode 2 where the UE senses a specific subset of the periodic resource (every 100 ms).

The UE may only (re)select resources within the sensed subset of resources.

It is up to UE implementation:

How to select the sensed resource subset;

Whether and when to change the sensed resource subset.

Summary of Some Proposed Embodiments and Related Observations

Proposed Embodiments

A new "V2X Transmission Mode 3" is introduced for random resource selection.

V2X Transmission Mode 3 is only allowed in a dedicated "Transmission Mode 3" pool.

The TM3 pool may overlap with TM1 and TM2 pools according to NW (pre)configuration.

Observations

It is more appropriate to express the authorization in terms of "transmission modes" as done so far in sidelink rather than authorizing a "pedestrian UE".

In LTE there is only a single UE node definition with configurable capabilities.

Proposed Embodiment

Inform RAN3 about the need for a specific authorization for V2X Transmission Mode 3.

Proposed Embodiments

Continue study of an energy efficient version of Mode 2 with reduced sensing.

At this point it doesn't seem justified to define a new Transmission Mode for UEs with reduced sensing.

UEs performing reduced sensing should be able to share the same resources as other Mode 1/2 UEs and they should not affect the performance of the other Mode 1/2 UEs.

Vehicular UEs should not be allowed to perform reduced sensing.

Inform RAN3 about the need for a specific authorization for reduced sensing (in case RAN1 decides to specify reduced sensing).

Proposed Embodiment

Introduce mode-3 as a resource selection mode that is suitable for handheld devices No sidelink reception capabilities required for mode-3

IDLE operation supported

Limited OOC operation if device does not have SS/PDSCH detection capability.

Proposed Embodiments

Mode-3 resource (re)selection is identical to Mode-2 except for the following aspects:

The SA/data resources (re)selected as a consequence of a (re)selection trigger are chosen according to UE implementation among the allowed resources in the Mode 3 pool In case of resource reselection the UE shall not reselect a resource corresponding to the previous selection.

The reselection timer for Mode 3 should be studied further and might differ from Mode 2.

All other reselection triggers are identical to Mode 2.

Proposed Embodiments

Allowed Tx format (e.g., MCS, scheduled BW and max nr of retx) for Mode 3 are (pre)configured or signaled in SIB.

UE can choose any Tx formats according to its implementation within the limits set by the eNB.

Observation

Sensing over a short time window (e.g., 100 ms) immediately preceding the reselection trigger does not allow detection of colliding transmissions.

Proposed Embodiments

If reduced sensing is supported:
  Reduced sensing is a special case of Mode 2 where the UE senses a specific subset of the periodic resource (every 100 ms).
  The UE may only (re)select resources within the sensed subset of resources.
  It is up to UE implementation:
    How to select the sensed resource subset;
    Whether and when to change the sensed resource subset.

Various further embodiments of the present disclosure are summarized below by the following first listing of embodiments:

First Listing of Embodiment

Embodiment 1

A method by a first user equipment, UE, (100) for communication of packets, the method comprising:
  obtaining (1000) a basic period value related to expected timing of transmissions by a second UE (100);
  obtaining (1002) a sub-period value that is less than the basic period value;
  monitoring (1004) radio resources for a packet or booking message transmitted by the second UE (100) which indicates an intention of the second UE (100) to potentially transmit a next packet using a radio resource and timing, wherein the monitoring is restricted to being performed during a timeframe determined based on the sub-period value once within each occurrence of a time period determined based on the basic period value; and
  responsive to the monitoring identifying the packet or booking message, selecting (1006) a radio resource for use in transmitting a packet that attempts to avoid collision with the radio resource and timing that is to be used by the second UE (100) to transmit the next packet.

Embodiment 2

The method of Embodiment 1, wherein the method is performed for Vehicle-to-X, V2x, communication of packets.

Embodiment 3

The method of Embodiment 2, wherein the radio resources that are monitored (1004) are among resources which are used by other UEs for V2x mode 2 communications.

Embodiment 4

The method of any of Embodiments 1 through 3, wherein the obtaining (1000) a basic period value obtains a basic period of time (T) that is expected to occur between two transmissions by a second UE (100), and the obtaining (1002) a sub-period value obtains a sub-period of time (Treduced) that is less than the basic period of time (T).

Embodiment 5

The method of any of Embodiments 1 through 4, wherein the obtaining (1000) a basic period value obtains a number of subframes that is expected to occur between two transmissions by a second UE (100), the sub-period value is less than the number of subframes.

Embodiment 6

The method of any of Embodiments 1 through 5, further comprising:
  transmitting (1100) the packet through a transmitter circuit of the first UE (100) using the radio resource that is selected.

Embodiment 7

The method of Embodiment 6, wherein the radio resource used for the transmitting (1100) is selected to be among the radio resources that were monitored (1004).

Embodiment 8

The method of Embodiment 7, wherein the radio resource used for the transmitting (1100) is selected to be among the radio resources that were monitored (1004) but further selected to be different from a radio resource that was used for a last transmission by the UE (100) before a present resource reselection operation.

Embodiment 9

The method of any of Embodiments 1 through 8, wherein the monitoring is restricted to being performed during the timeframe determined based on the sub-period value and occurring immediately adjacent but prior to a resource selection timing or resource reselection timing.

Embodiment 10

The method of Embodiment 9, wherein the monitoring is restricted to being performed during a same location of the timeframe prior to each occurrence of the resource selection timing or resource reselection timing.

Embodiment 11

The method of any of Embodiments 1 through 10, wherein the timeframe is 10 ms.

Embodiment 12

The method of any of Embodiments 1 through 11, wherein the monitoring is restricted to being performed during the timeframe determined based on the sub-period value and occurring immediately adjacent but prior to a resource selection timing or resource reselection timing.

Embodiment 13

The method of any of Embodiments 1 through 12, wherein:
  the UE is a vehicle electronic device; and responsive to the UE being a vehicle electronic device, enabling operation of the monitoring (1004) during an extended timeframe that extends beyond but includes the timeframe determined based on the sub-period value.

Embodiment 14

The method of Embodiment 13, wherein the extended timeframe corresponds to the time period determined based on the basic period value.

Embodiment 15

A user equipment, UE, (100) for communication of packets, the UE (100) configured to perform the method of any of Embodiments 1 through 14.

Embodiment 16

A user equipment, UE, (100) for communication of packets, the UE (100) comprising:
a radio transceiver (1920);
at least one processor (1902); and
at least one memory (1910) coupled to the at least one processor (1902) and the radio transceiver (1920), and storing program code that when executed by the at least one processor (1902) causes the at least one processor (1902) to perform operations comprising:
  obtain (1000) a basic period value related to expected timing of transmissions by a second UE (100);
  obtain (1002) a sub-period value that is less than the basic period value;
  monitor (1004) radio resources for a packet or booking message transmitted by the second UE (100) which indicates an intention of the second UE (100) to potentially transmit a next packet using a radio resource and timing, wherein the monitoring is restricted to being performed during a timeframe determined based on the sub-period value once within each occurrence of a time period determined based on the basic period value; and
  responsive to the monitoring identifying the packet or booking message, select (1006) a radio resource for use in transmitting a packet that attempts to avoid collision with the radio resource and timing that is to be used by the second UE (100) to transmit the next packet.

Embodiment 17

The UE (100) of Embodiment 16, wherein the operations perform the method of any of Embodiments 2 through 14.

Embodiment 18

A user equipment, UE, (100) for communication of packets, the UE (100) comprising:
an obtaining module (2000) for obtaining (1000) a basic period value related to expected timing of transmissions by a second UE (100), and for obtaining (1002) a sub-period value that is less than the basic period value;
a monitoring module (2002) for monitoring (1004) radio resources for a packet or booking message transmitted by the second UE (100) which indicates an intention of the second UE (100) to potentially transmit a next packet using a radio resource and timing, wherein the monitoring is restricted to being performed during a timeframe determined based on the sub-period value once within each occurrence of a time period determined based on the basic period value; and
a selecting module (2004) for, responsive to receiving the booking message, selecting (1006) a radio resource for use in transmitting a packet that attempts to avoid collision with the radio resource and timing that is to be used by the second UE (100) to transmit the next packet.

Embodiment 19

The UE (100) of Embodiment 18 for performing the method of any of Embodiments 2 through 14.

Various other embodiments of the present disclosure are summarized below by the following second listing of embodiments:

Second Listing of Embodiments

Embodiment 1

A method by a first user equipment, UE, (100) for communication of packets, the method comprising:
obtaining (1000) a basic period value related to expected timing of transmissions by a second UE (100);
obtaining (1002) a sub-period value that is less than the basic period value;
monitoring (1004) radio resources for a packet or booking message transmitted by the second UE (100) which indicates an intention of the second UE (100) to potentially transmit a next packet using a radio resource and timing,
  wherein the monitoring is restricted to being performed during a timeframe determined based on the sub-period value once within each occurrence of a time period determined based on the basic period value, and
  wherein a location of the timeframe and/or a part of radio spectrum that is used during the monitoring (1004) is controlled to change between at least some repetitions of the monitoring (1004) according to a defined rule; and
responsive to the monitoring identifying the packet or booking message, selecting (1006) a radio resource for use in transmitting a packet that attempts to avoid collision with the radio resource and timing that is to be used by the second UE (100) to transmit the next packet.

Embodiment 2

The method of Embodiment 1, wherein the method is performed for Vehicle-to-X, V2x, communication of packets.

Embodiment 3

The method of any of Embodiments 1 through 2, wherein the obtaining (1000) a basic period value obtains a basic period of time (T) that is expected to occur between two transmissions by a second UE (100), and the obtaining (1002) a sub-period value obtains a sub-period of time (Treduced) that is less than the basic period of time (T).

Embodiment 4

The method of any of Embodiments 1 through 3, wherein the obtaining (1000) a basic period value obtains a number of subframes that is expected to occur between two transmissions by a second UE (100), the sub-period value is less than the number of subframes.

Embodiment 5

The method of Embodiment 1, further comprising:
transmitting (1100) the packet through a transmitter circuit of the first UE (100) using the radio resource that is selected.

Embodiment 6

The method of any of Embodiments 1 through 5, wherein the control of the monitoring (1004) to change the location of the timeframe and/or the part of radio spectrum between at least some repetitions of the monitoring (1004) according to a defined rule, comprises:
obtaining (1200) an offset value; and
shifting timing (1202) by the offset value for when a next performance of the monitoring is to be initiated.

Embodiment 7

The method of Embodiment 6, wherein the offset value comprises an offset timing (Toffset), and the shifting timing (1202) comprises shifting timing by the offset timing (Toffset).

Embodiment 8

The method of Embodiment 6, wherein the offset value comprises an offset number of subframes, and the shifting timing (1202) comprises shifting timing by the offset number of subframes.

Embodiment 9

The method of Embodiment 6, further comprising:
obtaining (1300) a cyclic shift number (N); and
responsive to occurrence of a number of repetitions of the monitoring being completed that equals the cyclic shift number (N), shifting timing (1302) by the offset value for when the next performance of the monitoring is to be initiated.

Embodiment 10

The method of any of Embodiments 1 through 9, wherein the control of the monitoring (1004) to change the location of the timeframe and/or the part of radio spectrum between at least some repetitions of the monitoring (1004) according to a defined rule, comprises:
performing (1400) the monitoring radio resources within a part of radio spectrum that is less than a range of the radio spectrum that is expected to be used for recurrent packet transmissions by the second UE (100).

Embodiment 11

The method of any of Embodiments 1 through 10, wherein the control of the monitoring (1004) to change the location of the timeframe and/or the part of radio spectrum between at least some repetitions of the monitoring (1004) according to a defined rule, comprises:
obtaining (1500) an offset timing (Toffset); and
incrementally shifting timing (1502) by the offset timing (Toffset) for when a next performance of the monitoring is to be initiated.

Embodiment 12

The method of Embodiment 6, wherein the control of the monitoring (1004) to change the location of the timeframe and/or the part of radio spectrum between at least some repetitions of the monitoring (1004) according to a defined rule, further comprises:
obtaining (1600) a cyclic shift number (N); and
responsive to occurrence of a number of repetitions of the monitoring being completed that equals the cyclic shift number (N), returning (1602) to an initial timing when a next performance of the monitoring is to be initiated.

Embodiment 13

The method of any of Embodiments 6 through 12, wherein the control of the monitoring (1004) to change the location of the timeframe and/or the part of radio spectrum between at least some repetitions of the monitoring (1004) according to a defined rule, further comprises:
obtaining (1700) an offset frequency (Foffset); and
performing (1702) the monitoring radio resources within a part of radio spectrum that incrementally shifts by the offset frequency (Foffset) between each repetition of the monitoring.

Embodiment 14

The method of Embodiment 13, wherein the control of the monitoring (1004) to change the location of the timeframe and/or the part of radio spectrum between at least some repetitions of the monitoring (1004) according to a defined rule, further comprises:
obtaining (1800) a cyclic shift number (N); and
responsive to occurrence of a number of repetitions of the monitoring being completed that equals the cyclic shift number (N), returning (1802) to using an initial part of the radio frequency for a next performance of the monitoring.

Embodiment 15

The method of any of Embodiments 1 through 14, wherein the obtaining (1002) a sub-period value that is less than the basic period value, comprises:
determining the sub-period value based on a remaining battery life of a battery of the UE (100).

Embodiment 16

The method of Embodiment 15, wherein the determining the sub-period value based on a remaining battery life of a battery of the UE (100), comprises:
reducing the sub-period value based on determining that the remaining battery life has fallen below a threshold level.

Embodiment 17

The method of any of Embodiments 1 through 16, wherein the obtaining (1002) a sub-period value that is less than the basic period value, comprises:
determining the sub-period value based on communication loading.

Embodiment 18

The method of Embodiment 17, wherein the determining the sub-period value based on communication loading, comprises:
increasing the sub-period value based on determining that communication loading is above a defined threshold; and
decreasing the sub-period value based on determining that communication loading is below the defined threshold.

Embodiment 19

The method of any of Embodiments 1 through 18, wherein the obtaining (1002) a sub-period value that is less than the basic period value, comprises:
determining the sub-period value based on priority of traffic that is to be transmitted.

Embodiment 20

The method of Embodiment 19, wherein the determining the sub-period value based on priority of that is to be transmitted, comprises:
increasing the sub-period value based on determining that urgent traffic is to be transmitted; and
decreasing the sub-period value based on determining that best-effort traffic is to be transmitted.

Embodiment 21

The method of any of Embodiments 1 through 20, wherein the obtaining (1002) a sub-period value that is less than the basic period value, comprises:
determining the sub-period value based on geographical location of the UE.

Embodiment 22

The method of any of Embodiments 1 through 21, wherein the obtaining (1002) a sub-period value that is less than the basic period value, comprises:
determining the sub-period value based on speed of the UE.

Embodiment 23

A user equipment, UE, (100) for communication of packets, the UE (100) configured to perform the method of any of Embodiments 1 through 22.

Embodiment 24

A user equipment, UE, (100) for communication of packets, the UE (100) comprising:
a radio transceiver (1920);
at least one processor (1902); and
at least one memory (1910) coupled to the at least one processor (1902) and the radio transceiver (1920), and storing program code that when executed by the at least one processor (1902) causes the at least one processor (1902) to perform operations comprising:
obtain (1000) a basic period value related to expected timing of transmissions by a second UE (100);
obtain (1002) a sub-period value that is less than the basic period value;
monitor (1004) radio resources for a packet or booking message transmitted by the second UE (100) which indicates an intention of the second UE (100) to potentially transmit a next packet using a radio resource and timing,
wherein the monitoring is restricted to being performed during a timeframe determined based on the sub-period value once within each occurrence of a time period determined based on the basic period value, and
wherein a location of the timeframe and/or a part of radio spectrum that is used during the monitoring (1004) is controlled to change between at least some repetitions of the monitoring (1004) according to a defined rule; and
responsive to the monitoring identifying the packet or booking message, select (1006) a radio resource for use in transmitting a packet that attempts to avoid collision with the radio resource and timing that is to be used by the second UE (100) to transmit the next packet.

Embodiment 25

The UE (100) of Embodiment 24, wherein the operations perform the method of any of Embodiments 2 through 22.

Embodiment 26

A user equipment, UE, (100) for communication of packets, the UE (100) comprising:
an obtaining module (2000) for obtaining (1000) a basic period value related to expected timing of transmissions by a second UE (100), and for obtaining (1002) a sub-period value that is less than the basic period value;
a monitoring module (2002) for monitoring (1004) radio resources for a packet or booking message transmitted by the second UE (100) which indicates an intention of the second UE (100) to potentially transmit a next packet using a radio resource and timing,
wherein the monitoring is restricted to being performed during a timeframe determined based on the sub-period value once within each occurrence of a time period determined based on the basic period value, and
wherein a location of the timeframe and/or a part of radio spectrum that is used during the monitoring (1004) is controlled to change between at least some repetitions of the monitoring (1004) according to a defined rule; and
a selecting module (2004) for, responsive to receiving the booking message, selecting (1006) a radio resource for use in transmitting a packet that attempts to avoid collision with the radio resource and timing that is to be used by the second UE (100) to transmit the next packet.

Embodiment 27

The UE (100) of Embodiment 26 for performing the method of any of Embodiments 2 through 22.

Abbreviations and Explanations

3G Third Generation of Mobile Telecommunications Technology
BSM Basic Safety Message
BW Bandwidth
CAM Cooperative Awareness Message
CDMA Code-Division Multiple Access
D2D Device-to-Device Communication
DENM Decentralized Environmental Notification Message DSRC Dedicated Short-Range Communications
eNB eNodeB
ETSI European Telecommunications Standards Institute
FDMA Frequency-Division Multiple Access
GLONASS Global Navigation Satellite System
GSM Global System for Mobile Communications
GPS Global Positioning System
LTE Long-Term Evolution
NW Network
OFDM Orthogonal-Frequency-Division Multiplexing
PSBCH Physical Sidelink Broadcast Channel
TA Timing Advance
TDMA Time-Division Multiple Access
TF Transport Format
UTC Coordinated Universal Time
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine
wrt with respect to Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a first user equipment, UE, for selecting a radio resource for transmitting a packet, the method comprising:
obtaining a basic period value related to expected timing of transmissions by a second UE;
obtaining a sub-period value that is less than the basic period value;
monitoring radio resources for a packet or booking message that is transmitted by the second UE and indicates that the second UE will potentially transmit a next packet using a radio resource and timing, wherein the monitoring is restricted to a timeframe determined based on the sub-period value within each occurrence of a time period determined based on the basic period value; and responsive to the monitoring identifying the packet or booking message, selecting a radio resource for use in transmitting a packet based on the radio resource and timing that is potentially to be used by the second UE to transmit the next packet.

2. The method of claim 1, wherein the method is performed for sidelink Vehicle-to-X, V2x, communication of packets.

3. The method of claim 2, wherein the radio resources that are monitored are among resources which are used by other UEs for V2x communications.

4. The method of claim 1, wherein the obtaining a basic period value obtains a basic period of time (T) that is a minimum time between two recurrent transmissions by the second UE, and the obtaining a sub-period value obtains a sub-period of time (Tlimited) that is less than the basic period of time (T).

5. The method of claim 1, wherein the obtaining a basic period value obtains a minimum number of subframes that is expected to occur between two transmissions by the second UE, wherein the sub-period value corresponds to fewer subframes than the minimum number of subframes.

6. The method of claim 1, further comprising:
transmitting the packet through a transmitter circuit of the first UE using the radio resource that is selected.

7. The method of claim 6, wherein the radio resource used for the transmitting is selected to be among the periodic repetitions of the radio resources that were monitored.

8. The method of claim 7, wherein the radio resource used for the transmitting is selected to be among the radio resources that were monitored but further selected to be different from a radio resource that was used for a last transmission by the first UE before a present resource reselection operation.

9. The method of claim 1, wherein the monitoring is restricted to the timeframe determined based on the sub-period value and occurring immediately adjacent but prior to a resource selection timing or resource reselection timing.

10. The method of claim 9, wherein the monitoring is restricted to a same location of the timeframe prior to each occurrence of the resource selection timing or resource reselection timing.

11. The method of claim 1,
wherein a location of the timeframe and/or a part of radio spectrum that is used during the monitoring is controlled to change between at least some repetitions of the monitoring according to a defined rule.

12. The method of claim 11, wherein control of the monitoring to change the location of the timeframe and/or the part of radio spectrum between at least some repetitions of the monitoring according to a defined rule, comprises:
obtaining an offset value; and
shifting timing by the offset value for when a next performance of the monitoring is to be initiated.

13. The method of claim 12, wherein the offset value comprises an offset timing (Toffset), and the step of shifting timing comprises shifting timing by the offset timing (Toffset).

14. The method of claim 12, wherein the offset value comprises an offset number of subframes, and the shifting timing comprises shifting timing by the offset number of subframes.

15. The method of claim 12, further comprising:
obtaining a cyclic shift number (N); and
responsive to occurrence of a number of repetitions of the monitoring being completed that equals the cyclic shift number (N), shifting timing by the offset value for when the next performance of the monitoring is to be initiated.

16. The method of claim 11, wherein the control of the monitoring to change the location of the timeframe and/or the part of radio spectrum between at least some repetitions of the monitoring according to a defined rule, comprises:
performing the monitoring radio resources within a part of radio spectrum that is less than a range of the radio spectrum that is expected to be used for recurrent packet transmissions by the second UE.

17. The method of claim 11, wherein the control of the monitoring to change the location of the timeframe and/or the part of radio spectrum between at least some repetitions of the monitoring according to a defined rule, comprises:
obtaining an offset timing (Toffset); and
incrementally shifting timing by the offset timing (Toffset) for when a next performance of the monitoring is to be initiated.

18. The method of claim 11, wherein the control of the monitoring to change the location of the timeframe and/or the part of radio spectrum between at least some repetitions of the monitoring according to a defined rule, further comprises:
obtaining a cyclic shift number (N); and
responsive to occurrence of a number of repetitions of the monitoring being completed that equals the cyclic shift number (N), returning to an initial timing when a next performance of the monitoring is to be initiated.

19. The method of claim 11, wherein the control of the monitoring to change the location of the timeframe and/or the part of radio spectrum between at least some repetitions of the monitoring according to a defined rule, further comprises:
obtaining an offset frequency (Foffset); and
performing the monitoring radio resources within a part of radio spectrum that incrementally shifts by the offset frequency (Foffset) between each repetition of the monitoring.

20. The method of claim 19, wherein the control of the monitoring to change the location of the timeframe and/or the part of radio spectrum between at least some repetitions of the monitoring according to a defined rule, further comprises:
obtaining a cyclic shift number (N); and
responsive to occurrence of a number of repetitions of the monitoring being completed that equals the cyclic shift number (N), returning to using an initial part of the radio frequency for a next performance of the monitoring.

21. The method of claim 11, wherein the obtaining a sub-period value that is less than the basic period value, comprises:
determining the sub-period value based on a remaining battery life of a battery of the UE.

22. The method of claim 21, wherein the determining the sub-period value based on a remaining battery life of a battery of the UE, comprises:
reducing the sub-period value based on determining that the remaining battery life has fallen below a threshold level.

23. The method of claim 11, wherein the obtaining a sub-period value that is less than the basic period value, comprises:
determining the sub-period value based on communication loading of the radio resources being monitored.

24. The method of claim 23, wherein the determining the sub-period value based on communication loading, comprises:
increasing the sub-period value based on determining that communication loading is above a defined threshold; and
decreasing the sub-period value based on determining that communication loading is below the defined threshold.

25. The method of claim 13, wherein the basic period value and/or the sub-period value is obtained through signaling received from a network node.

26. A user equipment, UE, that selects a radio resource for transmitting a packet, the UE comprising:
a radio transceiver;
at least one processor; and
at least one memory coupled to the at least one processor and the radio transceiver, and storing program code that when executed by the at least one processor causes the at least one processor to perform operations comprising:
obtain a basic period value related to expected timing of transmissions by a second UE;
obtain a sub-period value that is less than the basic period value;
monitor radio resources for a packet or booking message that is transmitted by the second UE and indicates that the second UE will potentially transmit a next packet using a radio resource and timing, wherein the monitoring is restricted to a timeframe determined based on the sub-period value within each occurrence of a time period determined based on the basic period value; and
responsive to the monitoring identifying the packet or booking message, select a radio resource for use in transmitting a packet through the radio transceiver based on the radio resource and timing that is potentially to be used by the second UE to transmit the next packet.

27. A computer program product for selecting a radio resource to be used by a user equipment to transmit a packet, the computer program product comprising:
a non-transitory computer readable medium storing program code that when executed by at least one processor of the user equipment causes the at least one processor to perform operations comprising:
obtaining a basic period value related to expected timing of transmissions by a second UE;
obtaining a sub-period value that is less than the basic period value;
monitoring radio resources for a packet or booking message that is transmitted by the second UE and indicates that the second UE will potentially transmit a next packet using a radio resource and timing, wherein the monitoring is restricted to a timeframe determined based on the sub-period value within each occurrence of a time period determined based on the basic period value; and
responsive to the monitoring identifying the packet or booking message, selecting (1006) a radio resource for use in transmitting a packet based on the radio resource and timing that is potentially to be used by the second UE to transmit the next packet.

* * * * *

UNITED STATES PATENT AND TRADEMARK OFFICE
CERTIFICATE OF CORRECTION

PATENT NO. : 10,313,851 B2
APPLICATION NO. : 15/550196
DATED : June 4, 2019
INVENTOR(S) : Blasco Serrano et al.

Page 1 of 1

It is certified that error appears in the above-identified patent and that said Letters Patent is hereby corrected as shown below:

In the Specification

In Column 2, Line 47, delete "unhooking" and insert -- unbooking --, therefor.

In Column 2, Line 49, delete "unhooking" and insert -- unbooking --, therefor.

In Column 2, Line 58, delete "to" and insert -- ta --, therefor.

In Column 3, Line 38, delete "unhooking" and insert -- unbooking --, therefor.

In Column 15, Line 25, delete "a is" and insert -- a 1s --, therefor.

In Column 15, Line 34, delete "is is" and insert -- 1s is --, therefor.

Signed and Sealed this
Twenty-second Day of October, 2019

Andrei Iancu
*Director of the United States Patent and Trademark Office*